United States Patent
Atasoy et al.

(10) Patent No.: US 9,843,217 B2
(45) Date of Patent: Dec. 12, 2017

(54) WIRELESS ENERGY TRANSFER FOR WEARABLES

(71) Applicant: WiTricity Corporation, Watertown, MA (US)

(72) Inventors: Oguz Atasoy, Somerville, MA (US); Peter Lorenz, Arlington, MA (US)

(73) Assignee: WiTricity Corporation, Watertown, MA (US)

( * ) Notice: Subject to any disclaimer, the term of this patent is extended or adjusted under 35 U.S.C. 154(b) by 199 days.

(21) Appl. No.: 14/983,703

(22) Filed: Dec. 30, 2015

(65) Prior Publication Data

US 2016/0197511 A1 Jul. 7, 2016

Related U.S. Application Data

(60) Provisional application No. 62/099,933, filed on Jan. 5, 2015, provisional application No. 62/138,794, filed on Mar. 26, 2015.

(51) Int. Cl.
*H01F 27/42* (2006.01)
*H02J 7/02* (2016.01)
(Continued)

(52) U.S. Cl.
CPC .............. *H02J 7/025* (2013.01); *H01F 38/14* (2013.01); *H02J 50/10* (2016.02); *H04B 5/0037* (2013.01);
(Continued)

(58) Field of Classification Search
CPC ....................................................... H02J 7/025
See application file for complete search history.

(56) References Cited

U.S. PATENT DOCUMENTS 645,576 A 3/1900 Tesla
649,621 A 5/1900 Tesla
(Continued)

FOREIGN PATENT DOCUMENTS

CA 142352 8/1912
CN 102239633 11/2011
(Continued)

OTHER PUBLICATIONS

R. C. Kuo et al., "In-Vehicles Wireless Charging System for Portable Devices," Proceedings of 2015 IEEE 82nd Vehicular Technology Conference (VTC2015-Fall), Boston, MA, 2015, pp. 1-3. (Sep. 6-9, 2015).
(Continued)

*Primary Examiner* — Daniel Puentes
(74) *Attorney, Agent, or Firm* — Fish & Richardson P.C.

(57) ABSTRACT

The disclosure features resonators to wirelessly transfer energy to a wireless power device including a device resonator coil having a dimension D. The resonator can include a first plurality of conductor windings wound approximately in a first plane and having first and second conductor leads, and a second plurality of conductor windings wound in a second plane and having third and fourth conductor leads. The first and third conductor leads can be coupled to each other and the second and the fourth conductor leads can be coupled to at least one capacitor. The first plane and second plane can be spaced apart by separation S and substantially parallel. The separation S between the first plane and second plane can be approximately equal to or greater than the dimension D of the device resonator coil.

22 Claims, 24 Drawing Sheets

(51) Int. Cl.
*H01F 38/14* (2006.01)
*H04B 5/00* (2006.01)
*H02J 50/10* (2016.01)

(52) U.S. Cl.
CPC ..... *H04B 5/0093* (2013.01); *H01F 2038/146* (2013.01)

(56) References Cited

U.S. PATENT DOCUMENTS

| | | |
|---|---|---|
| 787,412 A | 4/1905 | Tesla |
| 1,119,732 A | 12/1914 | Tesla |
| 2,133,494 A | 10/1938 | Waters |
| 3,517,350 A | 6/1970 | Beaver |
| 3,535,543 A | 10/1970 | Dailey |
| 3,780,425 A | 12/1973 | Penn et al. |
| 3,871,176 A | 3/1975 | Schukei |
| 4,088,999 A | 5/1978 | Fletcher et al. |
| 4,095,998 A | 6/1978 | Hanson |
| 4,180,795 A | 12/1979 | Matsuda et al. |
| 4,280,129 A | 7/1981 | Wells |
| 4,450,431 A | 5/1984 | Hochstein |
| 4,588,978 A | 5/1986 | Allen |
| 5,027,709 A | 7/1991 | Slagle |
| 5,033,295 A | 7/1991 | Schmid et al. |
| 5,034,658 A | 7/1991 | Hiering et al. |
| 5,053,774 A | 10/1991 | Schuermann et al. |
| 5,070,293 A | 12/1991 | Ishii et al. |
| 5,118,997 A | 6/1992 | El-Hamamsy |
| 5,216,402 A | 6/1993 | Carosa |
| 5,229,652 A | 7/1993 | Hough |
| 5,287,112 A | 2/1994 | Schuermann |
| 5,341,083 A | 8/1994 | Klontz et al. |
| 5,367,242 A | 11/1994 | Hulman |
| 5,374,930 A | 12/1994 | Schuermann |
| 5,408,209 A | 4/1995 | Tanzer et al. |
| 5,437,057 A | 7/1995 | Richley et al. |
| 5,455,467 A | 10/1995 | Young et al. |
| 5,493,691 A | 2/1996 | Barrett |
| 5,522,856 A | 6/1996 | Reineman |
| 5,528,113 A | 6/1996 | Boys et al. |
| 5,541,604 A | 7/1996 | Meier |
| 5,550,452 A | 8/1996 | Shirai et al. |
| 5,565,763 A | 10/1996 | Arrendale et al. |
| 5,630,835 A | 5/1997 | Brownlee |
| 5,697,956 A | 12/1997 | Bornzin |
| 5,703,461 A | 12/1997 | Minoshima et al. |
| 5,703,573 A | 12/1997 | Fujimoto et al. |
| 5,710,413 A | 1/1998 | King et al. |
| 5,742,471 A | 4/1998 | Barbee, Jr. et al. |
| 5,821,728 A | 10/1998 | Sshwind |
| 5,821,731 A | 10/1998 | Kuki et al. |
| 5,864,323 A | 1/1999 | Berthon |
| 5,898,579 A | 4/1999 | Boys et al. |
| 5,903,134 A | 5/1999 | Takeuchi |
| 5,923,544 A | 7/1999 | Urano |
| 5,940,509 A | 8/1999 | Jovanovich et al. |
| 5,957,956 A | 9/1999 | Kroll et al. |
| 5,959,245 A | 9/1999 | Moe et al. |
| 5,986,895 A | 11/1999 | Stewart et al. |
| 5,993,996 A | 11/1999 | Firsich |
| 5,999,308 A | 12/1999 | Nelson et al. |
| 6,012,659 A | 1/2000 | Nakazawa et al. |
| 6,047,214 A | 4/2000 | Mueller et al. |
| 6,066,163 A | 5/2000 | John |
| 6,067,473 A | 5/2000 | Greeninger et al. |
| 6,108,579 A | 8/2000 | Snell et al. |
| 6,127,799 A | 10/2000 | Krishnan |
| 6,176,433 B1 | 1/2001 | Uesaka et al. |
| 6,184,651 B1 | 2/2001 | Fernandez et al. |
| 6,207,887 B1 | 3/2001 | Bass et al. |
| 6,232,841 B1 | 5/2001 | Bartlett et al. |
| 6,238,387 B1 | 5/2001 | Miller, III |
| 6,252,762 B1 | 6/2001 | Amatucci |
| 6,436,299 B1 | 8/2002 | Baarman et al. |
| 6,450,946 B1 | 9/2002 | Forsell |
| 6,452,465 B1 | 9/2002 | Brown et al. |
| 6,459,218 B1 | 10/2002 | Boys et al. |
| 6,473,028 B1 | 10/2002 | Luc |
| 6,483,202 B1 | 11/2002 | Boys |
| 6,515,878 B1 | 2/2003 | Meins et al. |
| 6,535,133 B2 | 3/2003 | Gohara |
| 6,561,975 B1 | 5/2003 | Pool et al. |
| 6,563,425 B2 | 5/2003 | Nicholson et al. |
| 6,597,076 B2 | 7/2003 | Scheible et al. |
| 6,609,023 B1 | 8/2003 | Fischell et al. |
| 6,631,072 B1 | 10/2003 | Paul et al. |
| 6,650,227 B1 | 11/2003 | Bradin |
| 6,664,770 B1 | 12/2003 | Bartels |
| 6,673,250 B2 | 1/2004 | Kuennen et al. |
| 6,683,256 B2 | 1/2004 | Kao |
| 6,696,647 B2 | 2/2004 | Ono et al. |
| 6,703,921 B1 | 3/2004 | Wuidart et al. |
| 6,731,071 B2 | 5/2004 | Baarman |
| 6,749,119 B2 | 6/2004 | Scheible et al. |
| 6,772,011 B2 | 8/2004 | Dolgin |
| 6,798,716 B1 | 9/2004 | Charych |
| 6,803,744 B1 | 10/2004 | Sabo |
| 6,806,649 B2 | 10/2004 | Mollema et al. |
| 6,812,645 B2 | 11/2004 | Baarman |
| 6,825,620 B2 | 11/2004 | Kuennen et al. |
| 6,831,417 B2 | 12/2004 | Baarman |
| 6,839,035 B1 | 1/2005 | Addonisio et al. |
| 6,844,702 B2 | 1/2005 | Giannopoulos et al. |
| 6,856,291 B2 | 2/2005 | Mickle et al. |
| 6,858,970 B2 | 2/2005 | Malkin et al. |
| 6,906,495 B2 | 6/2005 | Cheng et al. |
| 6,917,163 B2 | 7/2005 | Baarman |
| 6,917,431 B2 | 7/2005 | Soljacic et al. |
| 6,937,130 B2 | 8/2005 | Scheible et al. |
| 6,960,968 B2 | 11/2005 | Odendaal et al. |
| 6,961,619 B2 | 11/2005 | Casey |
| 6,967,462 B1 | 11/2005 | Landis |
| 6,975,198 B2 | 12/2005 | Baarman |
| 6,988,026 B2 | 1/2006 | Breed et al. |
| 7,027,311 B2 | 4/2006 | Vanderelli et al. |
| 7,035,076 B1 | 4/2006 | Stevenson |
| 7,042,196 B2 | 5/2006 | Ka-Lai et al. |
| 7,069,064 B2 | 6/2006 | Govorgian et al. |
| 7,084,605 B2 | 8/2006 | Mickle et al. |
| 7,116,200 B2 | 10/2006 | Baarman et al. |
| 7,118,240 B2 | 10/2006 | Baarman et al. |
| 7,126,450 B2 | 10/2006 | Baarman et al. |
| 7,127,293 B2 | 10/2006 | MacDonald |
| 7,132,918 B2 | 11/2006 | Baarman et al. |
| 7,147,604 B1 | 12/2006 | Allen et al. |
| 7,180,248 B2 | 2/2007 | Kuennen et al. |
| 7,191,007 B2 | 3/2007 | Desai et al. |
| 7,193,418 B2 | 3/2007 | Freytag |
| D541,322 S | 4/2007 | Garrett et al. |
| 7,212,414 B2 | 5/2007 | Baarman |
| 7,233,137 B2 | 6/2007 | Nakamura et al. |
| D545,855 S | 7/2007 | Garrett et al. |
| 7,239,110 B2 | 7/2007 | Cheng et al. |
| 7,248,017 B2 | 7/2007 | Cheng et al. |
| 7,251,527 B2 | 7/2007 | Lyden |
| 7,288,918 B2 | 10/2007 | DiStefano |
| 7,340,304 B2 | 3/2008 | MacDonald |
| 7,375,492 B2 | 5/2008 | Calhoon et al. |
| 7,375,493 B2 | 5/2008 | Calhoon et al. |
| 7,378,817 B2 | 5/2008 | Calhoon et al. |
| 7,382,636 B2 | 6/2008 | Baarman et al. |
| 7,385,357 B2 | 6/2008 | Kuennen et al. |
| 7,443,135 B2 | 10/2008 | Cho |
| 7,462,951 B1 | 12/2008 | Baarman |
| 7,466,213 B2 | 12/2008 | Lobl et al. |
| 7,471,062 B2 | 12/2008 | Bruning |
| 7,474,058 B2 | 1/2009 | Baarman |
| 7,492,247 B2 | 2/2009 | Schmidt et al. |
| 7,514,818 B2 | 4/2009 | Abe et al. |
| 7,518,267 B2 | 4/2009 | Baarman |
| 7,521,890 B2 | 4/2009 | Lee et al. |
| 7,525,283 B2 | 4/2009 | Cheng et al. |
| 7,545,337 B2 | 6/2009 | Guenther |
| 7,554,316 B2 | 6/2009 | Stevens et al. |

(56) References Cited

U.S. PATENT DOCUMENTS

| | | |
|---|---|---|
| 7,599,743 B2 | 10/2009 | Hassler, Jr. et al. |
| 7,615,936 B2 | 11/2009 | Baarman et al. |
| 7,639,514 B2 | 12/2009 | Baarman |
| 7,741,734 B2 | 6/2010 | Joannopoulos et al. |
| 7,795,708 B2 | 9/2010 | Katti |
| 7,825,543 B2 | 11/2010 | Karalis et al. |
| 7,825,544 B2 | 11/2010 | Jansen et al. |
| 7,835,417 B2 | 11/2010 | Heideman et al. |
| 7,843,288 B2 | 11/2010 | Lee et al. |
| 7,844,306 B2 | 11/2010 | Shearer et al. |
| 7,863,859 B2 | 1/2011 | Soar |
| 7,880,337 B2 | 2/2011 | Farkas |
| 7,884,697 B2 | 2/2011 | Wei et al. |
| 7,885,050 B2 | 2/2011 | Lee |
| 7,919,886 B2 | 4/2011 | Tanaka |
| 7,923,870 B2 | 4/2011 | Jin |
| 7,932,798 B2 | 4/2011 | Tolle et al. |
| 7,948,209 B2 | 5/2011 | Jung |
| 7,952,322 B2 | 5/2011 | Partovi et al. |
| 7,963,941 B2 | 6/2011 | Wilk |
| 7,969,045 B2 | 6/2011 | Schmidt et al. |
| 7,994,880 B2 | 8/2011 | Chen et al. |
| 7,999,506 B1 | 8/2011 | Hollar et al. |
| 8,022,576 B2 | 9/2011 | Joannopoulos et al. |
| 8,035,255 B2 | 10/2011 | Kurs et al. |
| 8,076,800 B2 | 12/2011 | Joannopoulos et al. |
| 8,076,801 B2 | 12/2011 | Karalis et al. |
| 8,084,889 B2 | 12/2011 | Joannopoulos et al. |
| 8,097,983 B2 | 1/2012 | Karalis et al. |
| 8,106,539 B2 | 1/2012 | Schatz et al. |
| 8,115,448 B2 | 2/2012 | John |
| 8,131,378 B2 | 3/2012 | Greenberg et al. |
| 8,178,995 B2 | 5/2012 | Amano et al. |
| 8,193,769 B2 | 6/2012 | Azancot et al. |
| 8,212,414 B2 | 7/2012 | Howard et al. |
| 8,260,200 B2 | 9/2012 | Shimizu et al. |
| 8,304,935 B2 | 11/2012 | Karalis et al. |
| 8,324,759 B2 | 12/2012 | Karalis et al. |
| 8,334,620 B2 | 12/2012 | Park et al. |
| 8,362,651 B2 | 1/2013 | Hamam et al. |
| 8,395,282 B2 | 3/2013 | Joannopoulos et al. |
| 8,395,283 B2 | 3/2013 | Joannopoulos et al. |
| 8,400,017 B2 | 3/2013 | Kurs et al. |
| 8,400,018 B2 | 3/2013 | Joannopoulos et al. |
| 8,400,019 B2 | 3/2013 | Joannopoulos et al. |
| 8,400,020 B2 | 3/2013 | Joannopoulos et al. |
| 8,400,021 B2 | 3/2013 | Joannopoulos et al. |
| 8,400,022 B2 | 3/2013 | Joannopoulos et al. |
| 8,400,023 B2 | 3/2013 | Joannopoulos et al. |
| 8,400,024 B2 | 3/2013 | Joannopoulos et al. |
| 8,410,636 B2 | 4/2013 | Kurs et al. |
| 8,441,154 B2 | 5/2013 | Karalis et al. |
| 8,457,547 B2 | 6/2013 | Meskens |
| 8,461,719 B2 | 6/2013 | Kesler et al. |
| 8,461,720 B2 | 6/2013 | Kurs et al. |
| 8,461,721 B2 | 6/2013 | Karalis et al. |
| 8,461,722 B2 | 6/2013 | Kurs et al. |
| 8,461,817 B2 | 6/2013 | Martin et al. |
| 8,466,583 B2 | 6/2013 | Karalis et al. |
| 8,471,410 B2 | 6/2013 | Karalis et al. |
| 8,476,788 B2 | 7/2013 | Karalis et al. |
| 8,482,157 B2 | 7/2013 | Cook et al. |
| 8,482,158 B2 | 7/2013 | Kurs et al. |
| 8,487,480 B1 | 7/2013 | Kesler et al. |
| 8,497,601 B2 | 7/2013 | Hall et al. |
| 8,552,592 B2 | 10/2013 | Schatz et al. |
| 8,569,914 B2 | 10/2013 | Karalis et al. |
| 8,587,153 B2 | 11/2013 | Schatz et al. |
| 8,587,155 B2 | 11/2013 | Giler et al. |
| 8,598,743 B2 | 12/2013 | Hall et al. |
| 8,618,696 B2 | 12/2013 | Karalis et al. |
| 8,629,578 B2 | 1/2014 | Kurs et al. |
| 8,643,326 B2 | 2/2014 | Campanella et al. |
| 2002/0032471 A1 | 3/2002 | Loftin et al. |
| 2002/0105343 A1 | 8/2002 | Scheible et al. |
| 2002/0118004 A1 | 8/2002 | Scheible et al. |
| 2002/0130642 A1 | 9/2002 | Ettes et al. |
| 2002/0167294 A1 | 11/2002 | Odaohhara |
| 2003/0038641 A1 | 2/2003 | Scheible |
| 2003/0062794 A1 | 4/2003 | Scheible et al. |
| 2003/0062980 A1 | 4/2003 | Scheible et al. |
| 2003/0071034 A1 | 4/2003 | Thompson et al. |
| 2003/0124050 A1 | 7/2003 | Yadav et al. |
| 2003/0126948 A1 | 7/2003 | Yadav et al. |
| 2003/0160590 A1 | 8/2003 | Schaefer et al. |
| 2003/0199778 A1 | 10/2003 | Mickle et al. |
| 2003/0214255 A1 | 11/2003 | Baarman et al. |
| 2004/0000974 A1 | 1/2004 | Odenaal et al. |
| 2004/0026998 A1 | 2/2004 | Henriott et al. |
| 2004/0100338 A1 | 5/2004 | Clark |
| 2004/0113847 A1 | 6/2004 | Qi et al. |
| 2004/0130425 A1 | 7/2004 | Dayan et al. |
| 2004/0130915 A1 | 7/2004 | Baarman |
| 2004/0130916 A1 | 7/2004 | Baarman |
| 2004/0142733 A1 | 7/2004 | Parise |
| 2004/0150934 A1 | 8/2004 | Baarman |
| 2004/0189246 A1 | 9/2004 | Bulai et al. |
| 2004/0201361 A1 | 10/2004 | Koh et al. |
| 2004/0222751 A1 | 11/2004 | Mollema et al. |
| 2004/0227057 A1 | 11/2004 | Tuominen et al. |
| 2004/0232845 A1 | 11/2004 | Baarman |
| 2004/0233043 A1 | 11/2004 | Yazawa et al. |
| 2004/0267501 A1 | 12/2004 | Freed et al. |
| 2005/0007067 A1 | 1/2005 | Baarman et al. |
| 2005/0021134 A1 | 1/2005 | Opie |
| 2005/0027192 A1 | 2/2005 | Govari et al. |
| 2005/0033382 A1 | 2/2005 | Single |
| 2005/0085873 A1 | 4/2005 | Gord et al. |
| 2005/0093475 A1 | 5/2005 | Kuennen et al. |
| 2005/0104064 A1 | 5/2005 | Hegarty et al. |
| 2005/0104453 A1 | 5/2005 | Vanderelli et al. |
| 2005/0116650 A1 | 6/2005 | Baarman |
| 2005/0116683 A1 | 6/2005 | Cheng et al. |
| 2005/0122058 A1 | 6/2005 | Baarman et al. |
| 2005/0122059 A1 | 6/2005 | Baarman et al. |
| 2005/0125093 A1 | 6/2005 | Kikuchi et al. |
| 2005/0127849 A1 | 6/2005 | Baarman et al. |
| 2005/0127850 A1 | 6/2005 | Baarman et al. |
| 2005/0127866 A1 | 6/2005 | Hamilton et al. |
| 2005/0135122 A1 | 6/2005 | Cheng et al. |
| 2005/0140482 A1 | 6/2005 | Cheng et al. |
| 2005/0151511 A1 | 7/2005 | Chary |
| 2005/0156560 A1 | 7/2005 | Shimaoka et al. |
| 2005/0189945 A1 | 9/2005 | Reiderman |
| 2005/0194926 A1 | 9/2005 | DiStefano |
| 2005/0253152 A1 | 11/2005 | Klimov et al. |
| 2005/0288739 A1 | 12/2005 | Hassler, Jr. et al. |
| 2005/0288740 A1 | 12/2005 | Hassler, Jr. et al. |
| 2005/0288741 A1 | 12/2005 | Hassler, Jr. et al. |
| 2005/0288742 A1 | 12/2005 | Giordano et al. |
| 2006/0001509 A1 | 1/2006 | Gibbs |
| 2006/0010902 A1 | 1/2006 | Trinh et al. |
| 2006/0022636 A1 | 2/2006 | Xian et al. |
| 2006/0053296 A1 | 3/2006 | Busboom et al. |
| 2006/0061323 A1 | 3/2006 | Cheng et al. |
| 2006/0066443 A1 | 3/2006 | Hall |
| 2006/0090956 A1 | 5/2006 | Peshkovskiy et al. |
| 2006/0132045 A1 | 6/2006 | Baarman |
| 2006/0164866 A1 | 7/2006 | Vanderelli et al. |
| 2006/0181242 A1 | 8/2006 | Freed et al. |
| 2006/0184209 A1 | 8/2006 | John et al. |
| 2006/0184210 A1 | 8/2006 | Singhal et al. |
| 2006/0185809 A1 | 8/2006 | Elfrink et al. |
| 2006/0199620 A1 | 9/2006 | Greene et al. |
| 2006/0202665 A1 | 9/2006 | Hsu |
| 2006/0205381 A1 | 9/2006 | Beart et al. |
| 2006/0214626 A1 | 9/2006 | Nilson et al. |
| 2006/0219448 A1 | 10/2006 | Grieve et al. |
| 2006/0238365 A1 | 10/2006 | Vecchione et al. |
| 2006/0270440 A1 | 11/2006 | Shearer et al. |
| 2006/0281435 A1 | 12/2006 | Shearer et al. |
| 2007/0010295 A1 | 1/2007 | Greene et al. |
| 2007/0013483 A1 | 1/2007 | Stewart |
| 2007/0016089 A1 | 1/2007 | Fischell et al. |

(56) References Cited

U.S. PATENT DOCUMENTS

| | | |
|---|---|---|
| 2007/0021140 A1 | 1/2007 | Keyes, IV et al. |
| 2007/0024246 A1 | 2/2007 | Flaugher |
| 2007/0064406 A1 | 3/2007 | Beart |
| 2007/0069687 A1 | 3/2007 | Suzuki |
| 2007/0096875 A1 | 5/2007 | Waterhouse et al. |
| 2007/0105429 A1 | 5/2007 | Kohl et al. |
| 2007/0117596 A1 | 5/2007 | Greene et al. |
| 2007/0126650 A1 | 6/2007 | Guenther |
| 2007/0145830 A1 | 6/2007 | Lee et al. |
| 2007/0164839 A1 | 7/2007 | Naito |
| 2007/0171681 A1 | 7/2007 | Baarman |
| 2007/0176840 A1 | 8/2007 | Pristas et al. |
| 2007/0178945 A1 | 8/2007 | Cook et al. |
| 2007/0182367 A1 | 8/2007 | Partovi |
| 2007/0208263 A1 | 9/2007 | John et al. |
| 2007/0222542 A1 | 9/2007 | Joannopoulos et al. |
| 2007/0257636 A1 | 11/2007 | Phillips et al. |
| 2007/0267918 A1 | 11/2007 | Gyland |
| 2007/0276538 A1 | 11/2007 | Kjellsson et al. |
| 2008/0012569 A1 | 1/2008 | Hall et al. |
| 2008/0014897 A1 | 1/2008 | Cook et al. |
| 2008/0030415 A1 | 2/2008 | Homan et al. |
| 2008/0036588 A1 | 2/2008 | Iverson et al. |
| 2008/0047727 A1 | 2/2008 | Sexton et al. |
| 2008/0051854 A1 | 2/2008 | Bulkes et al. |
| 2008/0067874 A1 | 3/2008 | Tseng |
| 2008/0132909 A1 | 6/2008 | Jascob et al. |
| 2008/0154331 A1 | 6/2008 | John et al. |
| 2008/0176521 A1 | 7/2008 | Singh et al. |
| 2008/0191638 A1 | 8/2008 | Kuennen et al. |
| 2008/0197710 A1 | 8/2008 | Kreitz et al. |
| 2008/0197802 A1 | 8/2008 | Onishi et al. |
| 2008/0211320 A1 | 9/2008 | Cook et al. |
| 2008/0238364 A1 | 10/2008 | Weber et al. |
| 2008/0255901 A1 | 10/2008 | Carroll et al. |
| 2008/0265684 A1 | 10/2008 | Farkas |
| 2008/0266748 A1 | 10/2008 | Lee |
| 2008/0272860 A1 | 11/2008 | Pance |
| 2008/0273242 A1 | 11/2008 | Woodgate et al. |
| 2008/0278264 A1 | 11/2008 | Karalis et al. |
| 2008/0291277 A1 | 11/2008 | Jacobsen et al. |
| 2008/0300657 A1 | 12/2008 | Stultz |
| 2008/0300660 A1 | 12/2008 | John |
| 2009/0010028 A1 | 1/2009 | Baarmen et al. |
| 2009/0015075 A1 | 1/2009 | Cook et al. |
| 2009/0033280 A1 | 2/2009 | Choi et al. |
| 2009/0033564 A1 | 2/2009 | Cook et al. |
| 2009/0038623 A1 | 2/2009 | Farbarik et al. |
| 2009/0045772 A1 | 2/2009 | Cook et al. |
| 2009/0051224 A1 | 2/2009 | Cook et al. |
| 2009/0058189 A1 | 3/2009 | Cook et al. |
| 2009/0058361 A1 | 3/2009 | John |
| 2009/0067198 A1 | 3/2009 | Graham et al. |
| 2009/0072627 A1 | 3/2009 | Cook et al. |
| 2009/0072628 A1 | 3/2009 | Cook et al. |
| 2009/0072629 A1 | 3/2009 | Cook et al. |
| 2009/0072782 A1 | 3/2009 | Randall |
| 2009/0079268 A1 | 3/2009 | Cook et al. |
| 2009/0079387 A1 | 3/2009 | Jin et al. |
| 2009/0085408 A1 | 4/2009 | Bruhn |
| 2009/0085706 A1 | 4/2009 | Baarman et al. |
| 2009/0096413 A1 | 4/2009 | Patovi et al. |
| 2009/0102292 A1 | 4/2009 | Cook et al. |
| 2009/0108679 A1 | 4/2009 | Porwal |
| 2009/0108997 A1 | 4/2009 | Patterson et al. |
| 2009/0115628 A1 | 5/2009 | Dicks et al. |
| 2009/0127937 A1 | 5/2009 | Widmer et al. |
| 2009/0134712 A1 | 5/2009 | Cook et al. |
| 2009/0146892 A1 | 6/2009 | Shimizu et al. |
| 2009/0153273 A1 | 6/2009 | Chen |
| 2009/0160261 A1 | 6/2009 | Elo |
| 2009/0161078 A1 | 6/2009 | Wu et al. |
| 2009/0167449 A1 | 7/2009 | Cook et al. |
| 2009/0174263 A1 | 7/2009 | Baarman et al. |
| 2009/0179502 A1 | 7/2009 | Cook et al. |
| 2009/0188396 A1 | 7/2009 | Hofmann et al. |
| 2009/0189458 A1 | 7/2009 | Kawasaki |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0218884 A1 | 9/2009 | Soar |
| 2009/0224608 A1 | 9/2009 | Cook et al. |
| 2009/0224609 A1 | 9/2009 | Cook et al. |
| 2009/0224723 A1 | 9/2009 | Tanabe |
| 2009/0224856 A1 | 9/2009 | Karalis et al. |
| 2009/0230777 A1 | 9/2009 | Baarman et al. |
| 2009/0237194 A1 | 9/2009 | Waffenschmidt et al. |
| 2009/0243394 A1 | 10/2009 | Levine |
| 2009/0243397 A1 | 10/2009 | Cook et al. |
| 2009/0251008 A1 | 10/2009 | Sugaya |
| 2009/0261778 A1 | 10/2009 | Kook |
| 2009/0267558 A1 | 10/2009 | Jung |
| 2009/0267709 A1 | 10/2009 | Joannopoulos et al. |
| 2009/0267710 A1 | 10/2009 | Joannopoulos et al. |
| 2009/0271047 A1 | 10/2009 | Wakamatsu |
| 2009/0271048 A1 | 10/2009 | Wakamatsu |
| 2009/0273242 A1 | 11/2009 | Cook |
| 2009/0273318 A1 | 11/2009 | Rondoni et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284218 A1 | 11/2009 | Mohammadian et al. |
| 2009/0284220 A1 | 11/2009 | Toncich et al. |
| 2009/0284227 A1 | 11/2009 | Mohammadian et al. |
| 2009/0284245 A1 | 11/2009 | Kirby et al. |
| 2009/0284369 A1 | 11/2009 | Toncich et al. |
| 2009/0286470 A1 | 11/2009 | Mohammadian et al. |
| 2009/0286475 A1 | 11/2009 | Toncich et al. |
| 2009/0286476 A1 | 11/2009 | Toncich et al. |
| 2009/0289595 A1 | 11/2009 | Chen et al. |
| 2009/0299918 A1 | 12/2009 | Cook et al. |
| 2009/0308933 A1 | 12/2009 | Osada |
| 2009/0322158 A1 | 12/2009 | Stevens et al. |
| 2009/0322280 A1 | 12/2009 | Kamijo et al. |
| 2010/0015918 A1 | 1/2010 | Liu et al. |
| 2010/0017249 A1 | 1/2010 | Fincham et al. |
| 2010/0033021 A1 | 2/2010 | Bennett |
| 2010/0034238 A1 | 2/2010 | Bennett |
| 2010/0036773 A1 | 2/2010 | Bennett |
| 2010/0038970 A1 | 2/2010 | Cook et al. |
| 2010/0045114 A1 | 2/2010 | Sample et al. |
| 2010/0052431 A1 | 3/2010 | Mita |
| 2010/0052811 A1 | 3/2010 | Smith et al. |
| 2010/0060077 A1 | 3/2010 | Paulus et al. |
| 2010/0065352 A1 | 3/2010 | Ichikawa |
| 2010/0066349 A1 | 3/2010 | Lin et al. |
| 2010/0076524 A1 | 3/2010 | Forsberg et al. |
| 2010/0081379 A1 | 4/2010 | Cooper et al. |
| 2010/0094381 A1 | 4/2010 | Kim et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0104031 A1 | 4/2010 | Lacour |
| 2010/0109443 A1 | 5/2010 | Cook et al. |
| 2010/0109445 A1 | 5/2010 | Kurs et al. |
| 2010/0109604 A1 | 5/2010 | Boys et al. |
| 2010/0115474 A1 | 5/2010 | Takada et al. |
| 2010/0117454 A1 | 5/2010 | Cook et al. |
| 2010/0117455 A1 | 5/2010 | Joannopoulos et al. |
| 2010/0117456 A1 | 5/2010 | Karalis et al. |
| 2010/0117596 A1 | 5/2010 | Cook et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0123452 A1 | 5/2010 | Amano et al. |
| 2010/0123530 A1 | 5/2010 | Park et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0127660 A1 | 5/2010 | Cook et al. |
| 2010/0133918 A1 | 6/2010 | Joannopoulos et al. |
| 2010/0133919 A1 | 6/2010 | Joannopoulos et al. |

(56) References Cited

U.S. PATENT DOCUMENTS

| | | |
|---|---|---|
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2010/0148723 A1 | 6/2010 | Cook et al. |
| 2010/0151808 A1 | 6/2010 | Toncich et al. |
| 2010/0156346 A1 | 6/2010 | Takada et al. |
| 2010/0156355 A1 | 6/2010 | Bauerle et al. |
| 2010/0156570 A1 | 6/2010 | Hong et al. |
| 2010/0164295 A1 | 7/2010 | Ichikawa et al. |
| 2010/0164296 A1 | 7/2010 | Kurs |
| 2010/0164297 A1 | 7/2010 | Kurs et al. |
| 2010/0164298 A1 | 7/2010 | Karalis et al. |
| 2010/0171368 A1 | 7/2010 | Schatz et al. |
| 2010/0171370 A1 | 7/2010 | Karalis et al. |
| 2010/0179384 A1 | 7/2010 | Hoeg et al. |
| 2010/0181843 A1 | 7/2010 | Schatz et al. |
| 2010/0181844 A1 | 7/2010 | Karalis et al. |
| 2010/0181845 A1 | 7/2010 | Fiorello et al. |
| 2010/0181961 A1 | 7/2010 | Novak et al. |
| 2010/0181964 A1 | 7/2010 | Huggins et al. |
| 2010/0184371 A1 | 7/2010 | Cook et al. |
| 2010/0187911 A1 | 7/2010 | Joannopoulos et al. |
| 2010/0187913 A1 | 7/2010 | Sample |
| 2010/0188183 A1 | 7/2010 | Shpiro |
| 2010/0190435 A1 | 7/2010 | Cook et al. |
| 2010/0190436 A1 | 7/2010 | Cook et al. |
| 2010/0194206 A1 | 8/2010 | Burdo et al. |
| 2010/0194207 A1 | 8/2010 | Graham |
| 2010/0194334 A1 | 8/2010 | Kirby et al. |
| 2010/0194335 A1 | 8/2010 | Kirby et al. |
| 2010/0201189 A1 | 8/2010 | Kirby et al. |
| 2010/0201201 A1 | 8/2010 | Mobarhan et al. |
| 2010/0201202 A1 | 8/2010 | Kirby et al. |
| 2010/0201203 A1 | 8/2010 | Schatz et al. |
| 2010/0201204 A1 | 8/2010 | Sakoda et al. |
| 2010/0201205 A1 | 8/2010 | Karalis et al. |
| 2010/0201310 A1 | 8/2010 | Vorenkamp et al. |
| 2010/0201312 A1 | 8/2010 | Kirby et al. |
| 2010/0201313 A1 | 8/2010 | Vorenkamp et al. |
| 2010/0201316 A1 | 8/2010 | Takada et al. |
| 2010/0201513 A1 | 8/2010 | Vorenkamp et al. |
| 2010/0207458 A1 | 8/2010 | Joannopoulos et al. |
| 2010/0210233 A1 | 8/2010 | Cook et al. |
| 2010/0213770 A1 | 8/2010 | Kikuchi |
| 2010/0213895 A1 | 8/2010 | Keating et al. |
| 2010/0217553 A1 | 8/2010 | Von Novak et al. |
| 2010/0219694 A1 | 9/2010 | Kurs et al. |
| 2010/0219695 A1 | 9/2010 | Komiyama et al. |
| 2010/0219696 A1 | 9/2010 | Kojima |
| 2010/0222010 A1 | 9/2010 | Ozaki et al. |
| 2010/0225175 A1 | 9/2010 | Karalis et al. |
| 2010/0225270 A1 | 9/2010 | Jacobs et al. |
| 2010/0225271 A1 | 9/2010 | Oyobe et al. |
| 2010/0225272 A1 | 9/2010 | Kirby et al. |
| 2010/0231053 A1 | 9/2010 | Karalis et al. |
| 2010/0231163 A1 | 9/2010 | Mashinsky |
| 2010/0231340 A1 | 9/2010 | Fiorello et al. |
| 2010/0234922 A1 | 9/2010 | Forsell |
| 2010/0235006 A1 | 9/2010 | Brown |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0237709 A1 | 9/2010 | Hall et al. |
| 2010/0244576 A1 | 9/2010 | Hillan et al. |
| 2010/0244577 A1 | 9/2010 | Shimokawa |
| 2010/0244578 A1 | 9/2010 | Yoshikawa |
| 2010/0244579 A1 | 9/2010 | Sogabe et al. |
| 2010/0244580 A1 | 9/2010 | Uchida et al. |
| 2010/0244581 A1 | 9/2010 | Uchida |
| 2010/0244582 A1 | 9/2010 | Yoshikawa |
| 2010/0244583 A1 | 9/2010 | Shimokawa |
| 2010/0244767 A1 | 9/2010 | Turner et al. |
| 2010/0244839 A1 | 9/2010 | Yoshikawa |
| 2010/0248622 A1 | 9/2010 | Kirby et al. |
| 2010/0253152 A1 | 10/2010 | Karalis et al. |
| 2010/0253281 A1 | 10/2010 | Li |
| 2010/0256481 A1 | 10/2010 | Mareci et al. |
| 2010/0256831 A1 | 10/2010 | Abramo et al. |
| 2010/0259108 A1 | 10/2010 | Giler et al. |
| 2010/0259109 A1 | 10/2010 | Sato |
| 2010/0259110 A1 | 10/2010 | Kurs et al. |
| 2010/0264745 A1 | 10/2010 | Karalis et al. |
| 2010/0264746 A1 | 10/2010 | Kazama et al. |
| 2010/0264747 A1 | 10/2010 | Hall et al. |
| 2010/0276995 A1 | 11/2010 | Marzetta et al. |
| 2010/0277003 A1 | 11/2010 | Von Novak et al. |
| 2010/0277004 A1 | 11/2010 | Suzuki et al. |
| 2010/0277005 A1 | 11/2010 | Karalis et al. |
| 2010/0277120 A1 | 11/2010 | Cook et al. |
| 2010/0277121 A1 | 11/2010 | Hall et al. |
| 2010/0289341 A1 | 11/2010 | Ozaki et al. |
| 2010/0289449 A1 | 11/2010 | Elo |
| 2010/0295505 A1 | 11/2010 | Jung et al. |
| 2010/0295506 A1 | 11/2010 | Ichikawa |
| 2010/0308939 A1 | 12/2010 | Kurs |
| 2010/0314946 A1 | 12/2010 | Budde et al. |
| 2010/0327660 A1 | 12/2010 | Karalis et al. |
| 2010/0327661 A1 | 12/2010 | Karalis et al. |
| 2010/0328044 A1 | 12/2010 | Waffenschmidt et al. |
| 2011/0004269 A1 | 1/2011 | Strother et al. |
| 2011/0012431 A1 | 1/2011 | Karalis et al. |
| 2011/0018361 A1 | 1/2011 | Karalis et al. |
| 2011/0025131 A1 | 2/2011 | Karalis et al. |
| 2011/0031928 A1 | 2/2011 | Soar |
| 2011/0043046 A1 | 2/2011 | Joannopoulos et al. |
| 2011/0043047 A1 | 2/2011 | Karalis et al. |
| 2011/0043048 A1 | 2/2011 | Karalis et al. |
| 2011/0043049 A1 | 2/2011 | Karalis et al. |
| 2011/0049995 A1 | 3/2011 | Hashiguchi |
| 2011/0049996 A1 | 3/2011 | Karalis et al. |
| 2011/0049998 A1 | 3/2011 | Karalis et al. |
| 2011/0074218 A1 | 3/2011 | Karalis et al. |
| 2011/0074346 A1 | 3/2011 | Hall et al. |
| 2011/0074347 A1 | 3/2011 | Karalis et al. |
| 2011/0089895 A1 | 4/2011 | Karalis et al. |
| 2011/0095618 A1 | 4/2011 | Schatz et al. |
| 2011/0115303 A1 | 5/2011 | Baarman et al. |
| 2011/0115431 A1 | 5/2011 | Dunworth et al. |
| 2011/0121920 A1 | 5/2011 | Kurs et al. |
| 2011/0128015 A1 | 6/2011 | Dorairaj et al. |
| 2011/0140544 A1 | 6/2011 | Karalis et al. |
| 2011/0148219 A1 | 6/2011 | Karalis et al. |
| 2011/0162895 A1 | 7/2011 | Karalis et al. |
| 2011/0169339 A1 | 7/2011 | Karalis et al. |
| 2011/0181122 A1 | 7/2011 | Karalis et al. |
| 2011/0193416 A1 | 8/2011 | Campanella et al. |
| 2011/0193419 A1 | 8/2011 | Karalis et al. |
| 2011/0198939 A1 | 8/2011 | Karalis et al. |
| 2011/0215086 A1 | 9/2011 | Yeh |
| 2011/0221278 A1 | 9/2011 | Karalis et al. |
| 2011/0227528 A1 | 9/2011 | Karalis et al. |
| 2011/0227530 A1 | 9/2011 | Karalis et al. |
| 2011/0241618 A1 | 10/2011 | Karalis et al. |
| 2011/0248573 A1 | 10/2011 | Kanno et al. |
| 2011/0254377 A1 | 10/2011 | Wildmer et al. |
| 2011/0254503 A1 | 10/2011 | Widmer et al. |
| 2011/0266878 A9 | 11/2011 | Cook et al. |
| 2011/0278943 A1 | 11/2011 | Eckhoff et al. |
| 2012/0001492 A9 | 1/2012 | Cook et al. |
| 2012/0001593 A1 | 1/2012 | DiGuardo |
| 2012/0007435 A1 | 1/2012 | Sada et al. |
| 2012/0007441 A1 | 1/2012 | John et al. |
| 2012/0025602 A1 | 2/2012 | Boys et al. |
| 2012/0032522 A1 | 2/2012 | Schatz et al. |
| 2012/0038525 A1 | 2/2012 | Monsalve Carcelen et al. |
| 2012/0062345 A1 | 3/2012 | Kurs et al. |
| 2012/0068549 A1 | 3/2012 | Karalis et al. |
| 2012/0086284 A1 | 4/2012 | Campanella et al. |
| 2012/0086867 A1 | 4/2012 | Kesler et al. |
| 2012/0091794 A1 | 4/2012 | Campanella et al. |
| 2012/0091795 A1 | 4/2012 | Fiorello et al. |
| 2012/0091796 A1 | 4/2012 | Kesler et al. |
| 2012/0091797 A1 | 4/2012 | Kesler et al. |
| 2012/0091819 A1 | 4/2012 | Kulikowski et al. |

(56) References Cited

U.S. PATENT DOCUMENTS

| | | |
|---|---|---|
| 2012/0091820 A1 | 4/2012 | Campanella et al. |
| 2012/0091949 A1 | 4/2012 | Campanella et al. |
| 2012/0091950 A1 | 4/2012 | Campanella et al. |
| 2012/0098350 A1 | 4/2012 | Campanella et al. |
| 2012/0112531 A1 | 5/2012 | Kesler et al. |
| 2012/0112532 A1 | 5/2012 | Kesler et al. |
| 2012/0112534 A1 | 5/2012 | Kesler et al. |
| 2012/0112535 A1 | 5/2012 | Karalis et al. |
| 2012/0112536 A1 | 5/2012 | Karalis et al. |
| 2012/0112538 A1 | 5/2012 | Kesler et al. |
| 2012/0112691 A1 | 5/2012 | Kurs et al. |
| 2012/0119569 A1 | 5/2012 | Karalis et al. |
| 2012/0119575 A1 | 5/2012 | Kurs et al. |
| 2012/0119576 A1 | 5/2012 | Kesler et al. |
| 2012/0119698 A1 | 5/2012 | Karalis et al. |
| 2012/0139355 A1 | 6/2012 | Ganem et al. |
| 2012/0146575 A1 | 6/2012 | Armstrong et al. |
| 2012/0153732 A1 | 6/2012 | Kurs et al. |
| 2012/0153733 A1 | 6/2012 | Schatz et al. |
| 2012/0153734 A1 | 6/2012 | Kurs et al. |
| 2012/0153735 A1 | 6/2012 | Karalis et al. |
| 2012/0153736 A1 | 6/2012 | Karalis et al. |
| 2012/0153737 A1 | 6/2012 | Karalis et al. |
| 2012/0153738 A1 | 6/2012 | Karalis et al. |
| 2012/0153893 A1 | 6/2012 | Schatz et al. |
| 2012/0184338 A1 | 7/2012 | Kesler et al. |
| 2012/0206096 A1 | 8/2012 | John |
| 2012/0223573 A1 | 9/2012 | Schatz et al. |
| 2012/0228952 A1 | 9/2012 | Hall et al. |
| 2012/0228953 A1 | 9/2012 | Kesler et al. |
| 2012/0228954 A1 | 9/2012 | Kesler et al. |
| 2012/0235500 A1 | 9/2012 | Ganem et al. |
| 2012/0235501 A1 | 9/2012 | Kesler et al. |
| 2012/0235502 A1 | 9/2012 | Kesler et al. |
| 2012/0235503 A1 | 9/2012 | Kesler et al. |
| 2012/0235504 A1 | 9/2012 | Kesler et al. |
| 2012/0235505 A1 | 9/2012 | Schatz et al. |
| 2012/0235566 A1 | 9/2012 | Karalis et al. |
| 2012/0235567 A1 | 9/2012 | Karalis et al. |
| 2012/0235633 A1 | 9/2012 | Kesler et al. |
| 2012/0235634 A1 | 9/2012 | Hall et al. |
| 2012/0239117 A1 | 9/2012 | Kesler et al. |
| 2012/0242159 A1 | 9/2012 | Lou et al. |
| 2012/0242225 A1 | 9/2012 | Karalis et al. |
| 2012/0248884 A1 | 10/2012 | Karalis et al. |
| 2012/0248886 A1 | 10/2012 | Kesler et al. |
| 2012/0248887 A1 | 10/2012 | Kesler et al. |
| 2012/0248888 A1 | 10/2012 | Kesler et al. |
| 2012/0248981 A1 | 10/2012 | Karalis et al. |
| 2012/0256494 A1 | 10/2012 | Kesler et al. |
| 2012/0267960 A1 | 10/2012 | Low et al. |
| 2012/0280765 A1 | 11/2012 | Kurs et al. |
| 2012/0313449 A1 | 12/2012 | Kurs et al. |
| 2012/0313742 A1 | 12/2012 | Kurs et al. |
| 2013/0007949 A1 | 1/2013 | Kurs et al. |
| 2013/0020878 A1 | 1/2013 | Karalis et al. |
| 2013/0033118 A1 | 2/2013 | Karalis et al. |
| 2013/0038402 A1 | 2/2013 | Karalis et al. |
| 2013/0057364 A1 | 3/2013 | Kesler et al. |
| 2013/0062966 A1 | 3/2013 | Verghese et al. |
| 2013/0069441 A1 | 3/2013 | Verghese et al. |
| 2013/0069753 A1 | 3/2013 | Kurs et al. |
| 2013/0099587 A1 | 4/2013 | Lou et al. |
| 2013/0154383 A1 | 6/2013 | Kasturi et al. |
| 2013/0154389 A1 | 6/2013 | Kurs et al. |
| 2013/0159956 A1 | 6/2013 | Verghese et al. |
| 2013/0175874 A1 | 7/2013 | Lou et al. |
| 2013/0175875 A1 | 7/2013 | Kurs et al. |
| 2013/0200716 A1 | 8/2013 | Kesler et al. |
| 2013/0200721 A1 | 8/2013 | Kurs et al. |
| 2013/0221744 A1 | 8/2013 | Hall et al. |
| 2013/0278073 A1 | 10/2013 | Kurs et al. |
| 2013/0278074 A1 | 10/2013 | Kurs et al. |
| 2013/0278075 A1 | 10/2013 | Kurs et al. |
| 2013/0300353 A1 | 11/2013 | Kurs et al. |
| 2013/0307349 A1 | 11/2013 | Hall et al. |
| 2013/0320773 A1 | 12/2013 | Schatz et al. |
| 2013/0334892 A1 | 12/2013 | Hall et al. |
| 2014/0002012 A1 | 1/2014 | McCauley et al. |
| 2014/0070764 A1 | 3/2014 | Keeling |
| 2014/0111151 A1 | 4/2014 | Keeling et al. |
| 2015/0084427 A1* | 3/2015 | Moon ............... H01F 38/14 307/104 |
| 2016/0181858 A1 | 6/2016 | Satyamoorthy et al. |

FOREIGN PATENT DOCUMENTS

| | | |
|---|---|---|
| CN | 102439669 | 5/2012 |
| CN | 103329397 | 9/2013 |
| DE | 38 24 972 | 1/1989 |
| DE | 100 29147 | 12/2001 |
| DE | 200 16 655 | 3/2002 |
| DE | 102 21 484 | 11/2003 |
| DE | 103 04 584 | 8/2004 |
| DE | 10 2005 036290 | 2/2007 |
| DE | 10 2006 044057 | 4/2008 |
| EP | 1 335 477 | 8/2003 |
| EP | 1 521 206 | 4/2005 |
| EP | 1 524 010 | 4/2005 |
| EP | 2 357 716 | 8/2011 |
| JP | 02-097005 | 4/1990 |
| JP | 4-265875 | 9/1992 |
| JP | 6-341410 | 12/1994 |
| JP | 9-182323 | 7/1997 |
| JP | 9-298847 | 11/1997 |
| JP | 10-164837 | 6/1998 |
| JP | 11-75329 | 3/1999 |
| JP | 11-188113 | 7/1999 |
| JP | 2001-309580 | 11/2001 |
| JP | 2002-010535 | 1/2002 |
| JP | 2003-179526 | 6/2003 |
| JP | 2004-166459 | 6/2004 |
| JP | 2004-201458 | 7/2004 |
| JP | 2004-229144 | 8/2004 |
| JP | 2005-57444 | 3/2005 |
| JP | 2005-149238 | 6/2005 |
| JP | 2006-074848 | 3/2006 |
| JP | 2007-505480 | 3/2007 |
| JP | 2007-266892 | 10/2007 |
| JP | 2007-537637 | 12/2007 |
| JP | 2008-508842 | 3/2008 |
| JP | 2008-206231 | 9/2008 |
| JP | 2008-206327 | 9/2008 |
| JP | 2011-072074 | 4/2011 |
| JP | 2012-504387 | 2/2012 |
| JP | 2013-543718 | 12/2013 |
| KR | 10-2007-0017804 | 2/2007 |
| KR | 10-2008-0007635 | 1/2008 |
| KR | 10-2009-0122072 | 11/2009 |
| KR | 10-2011-0050920 | 5/2011 |
| KR | 10-2012-0007296 | 1/2012 |
| KR | 10-2014-0073083 | 6/2014 |
| SG | 112842 | 7/2005 |
| WO | WO 92/17929 | 10/1992 |
| WO | WO 93/23908 | 11/1993 |
| WO | WO 94/28560 | 12/1994 |
| WO | WO 95/11545 | 4/1995 |
| WO | WO 96/02970 | 2/1996 |
| WO | WO 98/50993 | 11/1998 |
| WO | WO 00/77910 | 12/2000 |
| WO | WO 03/092329 | 11/2003 |
| WO | WO 03/096361 | 11/2003 |
| WO | WO 03/096512 | 11/2003 |
| WO | WO 2004/015885 | 2/2004 |
| WO | WO 2004/038888 | 5/2004 |
| WO | WO 2004/055654 | 7/2004 |
| WO | WO 2004/073150 | 8/2004 |
| WO | WO 2004/073166 | 8/2004 |
| WO | WO 2004/073176 | 8/2004 |
| WO | WO 2004/073177 | 8/2004 |
| WO | WO 2004/112216 | 12/2004 |
| WO | WO 2005/024865 | 3/2005 |
| WO | WO 2005/060068 | 6/2005 |
| WO | WO 2005/109597 | 11/2005 |

(56) References Cited

FOREIGN PATENT DOCUMENTS

| WO | WO 2005/109598 | 11/2005 |
|---|---|---|
| WO | WO 2006/011769 | 2/2006 |
| WO | WO 2007/008646 | 1/2007 |
| WO | WO 2007/020583 | 2/2007 |
| WO | WO 2007/042952 | 4/2007 |
| WO | WO 2007/084716 | 7/2007 |
| WO | WO 2007/084717 | 7/2007 |
| WO | WO 2008/109489 | 9/2008 |
| WO | WO 2008/118178 | 10/2008 |
| WO | WO 2009/009559 | 1/2009 |
| WO | WO 2009/018568 | 2/2009 |
| WO | WO 2009/023155 | 2/2009 |
| WO | WO 2009/023646 | 2/2009 |
| WO | WO 2009/033043 | 3/2009 |
| WO | WO 2009/062438 | 5/2009 |
| WO | WO 2009/070730 | 6/2009 |
| WO | WO 2009/126963 | 10/2009 |
| WO | WO 2009/140506 | 11/2009 |
| WO | WO 2009/149464 | 12/2009 |
| WO | WO 2009/155000 | 12/2009 |
| WO | WO 2010/030977 | 3/2010 |
| WO | WO 2010/036980 | 4/2010 |
| WO | WO 2010/039967 | 4/2010 |
| WO | WO 2010/090538 | 8/2010 |
| WO | WO 2010/090539 | 8/2010 |
| WO | WO 2010/093997 | 8/2010 |
| WO | WO 2010/104569 | 9/2010 |
| WO | WO 2011/061388 | 5/2011 |
| WO | WO 2011/061821 | 5/2011 |
| WO | WO 2011/062827 | 5/2011 |
| WO | WO 2011/112795 | 9/2011 |
| WO | WO 2012/037279 | 3/2012 |
| WO | WO 2012/170278 | 12/2012 |
| WO | WO 2013/013235 | 1/2013 |
| WO | WO 2013/020138 | 2/2013 |
| WO | WO 2013/036947 | 3/2013 |
| WO | WO 2013/059441 | 4/2013 |
| WO | WO 2013/067484 | 5/2013 |
| WO | WO 2013/113017 | 8/2013 |
| WO | WO 2013/142840 | 9/2013 |
| WO | WO 2014/004843 | 1/2014 |

OTHER PUBLICATIONS

R. C. Kuo et al., "A 3D resonant wireless charger for a wearable device and a mobile phone," 2015 IEEE Wireless Power Transfer Conference (WPTC), Boulder, CO, 2015, pp. 1-3. (May 13-15, 2015).

"Intel CTO Says Gap between Humans, Machines Will Close by 2050", *Intel News Release*, (See.intel.com/.../20080821comp. htm?iid=S . . . ) (Printed Nov. 6, 2009).

"Physics Update, Unwired Energy", *Physics Today*, pp. 26, (Jan. 2007) (See http://arxiv.org/abs/physics/0611063.).

"In pictures: A year in technology", *BBC News*, (Dec. 28, 2007).

"Next Little Thing 2010 Electricity without wires", CNN Money (See money.cnn.com/galleries/2009/smallbusiness/0911/gallery. next_little_thing_2010.smb/) (dated Nov. 30, 2009).

Abe et al. "A Noncontact Charger Using a Resonant Converter with Parallel Capacitor of the Secondary Coil". IEEE, 36(2):444-451, Mar./Apr. 2000.

Ahmadian, M. et al., "Miniature Transmitter for Implantable Micro Systems", *Proceedings of the 25th Annual International Conference of the IEEE EMBS Cancun, Mexico*, pp. 3028-3031 (Sep. 17-21, 2003).

Aoki, T. et al., "Observation of strong coupling between one atom and a monolithic microresonator", Nature, vol. 443:671-674 (2006).

Apneseth et al. "Introducing wireless proximity switches" ABB Review Apr. 2002.

Aristeidis Karalis et al., "Efficient Wireless non-radiative mid-range energy transfer", *Annals of Physics*, vol. 323, pp. 34-48 (2008).

Baker et al., "Feedback Analysis and Design of RF Power Links for Low-Power Bionic Systems," *IEEE Transactions on Biomedical Circuits and Systems*, vol. 1(1):28-38 (Mar. 2007).

Balanis, C.A., "Antenna Theory: Analysis and Design," 3rd Edition, Sections 4.2, 4.3, 5.2, 5.3 (Wiley, New Jersey, 2005).

Berardelli, P., "Outlets Are Out", ScienceNOW Daily News, Science Now, http://sciencenow.sciencemag.org/ cgi/content/full/2006/1114/2, (Nov. 14, 2006) 2 pages.

Biever, C., "Evanescent coupling' could power gadgets wirelessly", NewScientistsTech.com, http://www. newscientisttech.com/article. ns?id=dn1 0575&print=true, (Nov. 15, 2006) 2 pages.

Borenstein, S., "Man tries wirelessly boosting batteries", (The Associated Press), USA Today, (Nov. 16, 2006) 1 page.

Borenstein, S., "Man tries wirelessly boosting batteries", AP Science Writer, Boston.com, (See http://www.boston.com/business/technology/articles/2006/11/15/man_tries_wirelessly_b . . . ) (Nov. 15, 2006).

Boyle, A., "Electro-nirvana? Not so fast", MSNBC, http:/lcosmiclog.msnbc.msn.com/_news/2007/06/08/4350760- electro-nirvana-not-so-fast, (Jun. 8, 2007) 1 page.

Budhia, M. et al., "A New IPT Magnetic Coupler for Electric Vehicle Charging Systems", IECON 2010—36th Annual Conference on IEEE Industrial Electronics Society, Glendale, AZ, pp. 2487-2492 (Nov. 7-10, 2010).

Budhia, M. et al., "Development and evaluation of single sided flux couplers for contactless electric vehicle charging", 2011 IEEE Energy Conversion Congress and Exposition (ECCE), Phoenix, AZ, pp. 614-621 (Sep. 17-22, 2011).

Budhia, M. et al.,"Development of a Single-Sided Flux Magnetic Coupler for Electric Vehicle IPT", *IEEE Transactions on Industrial Electronics*, vol. 60:318-328 (Jan. 2013).

Bulkeley, W. M., "MIT Scientists Pave the Way for Wireless Battery Charging", The Wall Street Journal (See http://online.wsj.com/article/SB118123955549228045.html?mod=googlenews_wsj), (Jun. 8, 2007) 2 pages.

Burri al., "Invention Description", (Feb. 5, 2008).

Cass, S., "Air Power—Wireless data connections are common—now scientists are working on wireless power", Sponsored by IEEE Spectrum, http://spectrum.ieee.org/computing/hardware/air-power, (Nov. 2006) 2 pages.

Castelvecchi, Davide, "The Power of Induction—Cutting the last cord could resonate with our increasingly gadget dependent lives", *Science News Online*, vol. 172, No. 3, Jul. 21, 2007, 6 pages.

Chang, A., "Recharging the Wireless Way—Even physicists forget to recharge their cell phones sometimes.", PC Magazine, ABC News Internet Ventures, (Dec. 12, 2006) 1 page.

Chinaview, ,"Scientists light bulb with 'wireless electricity'",www.Chinaview.cn, http://news.xinhuanet.com/english/2007-06/08/content_6215681.htm,Jun. 2007,1 page.

Cooks, G., "The vision of an MIT physicist: Getting rid of pesky rechargers", Boston.com, (Dec. 11, 2006) 1 page.

Derbyshire, D., "The end of the plug? Scientists invent wireless device that beams electricity through your home", Daily Mail, http://www.dailymail.co.uk/pages/live/articles/technology/technology.html?in_article_id=4 . . . ), (Jun. 7, 2007) 3 pages.

Eisenberg, Anne, "Automatic Recharging, From a Distance", The New York Times, (see www.nytimes.com/2012/03/11/business/built-in-wireless-chargeing-for-electronic-devices.html?_r=0) (published on Mar. 10, 2012).

Esser et al., "A New Approach to Power Supplies for Robots", IEEE, vol. 27(5):872-875, (Sep./Oct. 1991).

Fan, Shanhui et al., "Rate-Equation Analysis of Output Efficiency and Modulation Rate of Photomic-Crystal Light-Emitting Diodes", IEEE Journal of Quantum Electronics, vol. 36(10):1123-1130 (Oct. 2000).

Fenske et al., "Dielectric Materials at Microwave Frequencies", Applied Microwave & Wireless, pp. 92-100 (2000).

Fernandez, C. et al., "A simple dc-dc converter for the power supply of a cochlear implant", *IEEE*, pp. 1965-1970 (2003).

Ferris, David, "How Wireless Charging Will Make Life Simpler (And Greener)", Forbes (See forbes.com/sites/davidferris/2012/07/24/how-wireless-charging-will-make-life-simpler-and-greener/print/) (dated Jul. 24, 2012).

Fildes, J., "Physics Promises Wireless Power", (Science and Technology Reporter), BBC News, (Nov. 15, 2006) 3 pages.

(56) References Cited

OTHER PUBLICATIONS

Fildes, J., "The technology with impact 2007", BBC News, (Dec. 27, 2007) 3 pages.
Fildes, J., "Wireless energy promise powers up", BBC News, http://news.bcc.co.uk/2/hi/tehnology/6725955.stm, (Jun. 7, 2007) 3 pages.
Finkenzeller, Klaus, "RFID Handbook—Fundamentals and Applications in Contactless Smart Cards", Nikkan Kohgyo-sya, Kanno Taihei, first version, pp. 32-37, 253 (Aug. 21, 2001).
Finkenzeller, Klaus, "RFID Handbook (2nd Edition)", The Nikkan Kogyo Shimbun, Ltd., pp. 19, 20, 38, 39, 43, 44, 62, 63, 67, 68, 87, 88, 291, 292 (Published on May 31, 2004).
Freedman, D.H., "Power on a Chip", MIT Technology Review, (Nov. 2004).
Gary Peterson, "MIT WiTricity Not So Original After All", *Feed Line No. 9*, (See http://www.ifcbooks.com/articles/witricity.htm) printed Nov. 12, 2009.
Geyi, Wen, "A Method for the Evaluation of Small Antenna Q", IEEE Transactions on Antennas and Propagation, vol. 51(8):2124-2129 (Aug. 2003).
Hadley, F., "Goodbye Wires—MIT Team Experimentally Demonstrates Wireless Power Transfer, Potentially Useful for Power Laptops, Cell-Phones Without Cords", Massachusetts Institute of Technology, Institute for Soldier D Nanotechnologies, http://web.mit.edu/newsoffice/2007/wireless-0607.html, (Jun. 7, 2007) 3 pages.
Haus, H.A., "Waves and Fields in Optoelectronics," Chapter 7 "Coupling of Modes—Resonators and Couplers" (Prentice-Hall, New Jersey, 1984).
Heikkinen et al., "Performance and Efficiency of Planar Rectennas for Short-Range Wireless Power Transfer at 2.45 GHz", Microwave and Optical Technology Letters, vol. 31(2):86-91, (Oct. 20, 2001).
Highfield, R., "Wireless revolution could spell end of plugs",(Science Editor), Telegraph.co.uk, http://www. telegraph.co.uk/news/main.jhtml?xml=/news/2007/06/07/nwireless1 07.xml, (Jun. 7, 2007) 3 pages.
Hirai et al., "Integral Motor with Driver and Wireless Transmission of Power and Information for Autonomous Subspindle Drive", IEEE, vol. 15(1):13-20, (Jan. 2000).
Hirai et al., "Practical Study on Wireless Transmission of Power and Information for Autonomous Decentralized Manufacturing System", IEEE, vol. 46(2):349-359, Apr. 1999.
Hirai et al., "Study on Intelligent Battery Charging Using Inductive Transmission of Power and Information", IEEE, vol. 15(2):335-345, (Mar. 2000).
Hirai et al., "Wireless Transmission of Power and Information and Information for Cableless Linear Motor Drive", IEEE, vol. 15(1):21-27, (Jan. 2000).
Hirayama, M., "Splashpower—World Leaders in Wireless Power", PowerPoint presentation, Splashpower Japan, (Sep. 3, 2007) 30 pages.
Ho, S. L. et al., "A Comparative Study Between Novel Witricity and Traditional Inductive Magnetic Coupling in Wireless Charging", IEEE Transactions on Magnetics, vol. 47(5):1522-1525 (May 2011).
Infotech Online, "Recharging gadgets without cables", infotech.indiatimes.com, (Nov. 17, 2006) 1 page.
Jackson, J. D., "Classical Electrodynamics", 3rd Edition, Wiley, New York, 1999, pp. 201-203.
Jackson, J.D., "Classical Electrodynamics," 3rd Edition, Sections 1.11, 5.5, 5.17, 6.9, 8.1, 8.8, 9.2, 9.3 (Wiley, New York, 1999).
Jacob, M. V. et al., "Lithium Tantalate—A High Permittivity Dielectric Material for Microwave Communication Systems", *Proceedings of IEEE TENCON—Poster Papers*, pp. 1362-1366, 2003.
Karalis, Aristeidis, "Electricity Unplugged", Feature: Wireless Energy Physics World, physicsworld.com, pp. 23-25 (Feb. 2009).
Kawamura et al., "Wireless Transmission of Power and Information Through One High-Frequency Resonant AC Link Inverter for Robot Manipulator Applications", IEEE, vol. 32(3):503-508, (May/Jun. 1996).

Kurs, A. et al., "Wireless Power Transfer via Strongly Coupled Magnetic Resonances", *Science* vol. 317, pp. 83-86 (Jul. 6, 2007).
Kurs, A. et al., "Simultaneous mid-range power transfer to multiple devices", *Applied Physics Letters*, vol. 96, No. 044102 (2010).
Kurs, A. et al.,"Optimized design of a low-resistance electrical conductor for the multimegahertz range", *Applied Physics Letters*, vol. 98:172504-172504-3 (Apr. 2011).
Lamb, Gregory M. ,"Look Ma—no wires! —Electricity broadcast through the air may someday run your home",The Christian Science Monitor,http://www.csmonitor.com/2006/1116/pl4s01-stct.html,Nov. 15, 2006,2 pages.
Lee, "Antenna Circuit Design for RFID Applications," Microchip Technology Inc., AN710, 50 pages (2003).
Lee, "RFID Coil Design", Microchip Technology Inc., AN678, 21 pages (1998).
Liang et al., "Silicon waveguide two-photon absorption detector at 1.5 μm wavelength for autocorrelation measurements," Applied Physics Letters, 81(7):1323-1325 (Aug. 12, 2002).
Markoff, J. ,"Intel Moves to Free Gadgets of Their Recharging Cords", The New York Times—nytimes.com, Aug. 21, 2008, 2 pages.
Mediano, A. et al. "Design of class E amplifier with nonlinear and linear shunt capacitances for any duty cycle", IEEE Trans. Microwave Theor. Tech., vol. 55, No. 3, pp. 484-492, (2007).
Microchip Technology Inc., "microID 13.56 MHz Design Guide—MCRF355/360 Reader Reference Design," 24 pages (2001).
Minkel, J R. ,"Wireless Energy Lights Bulb from Seven Feet Away—Physicists vow to cut the cord between your laptop battery and the wall socket—with just a simple loop of wire",Scientific American,http://www.scientificamerican.com/article.cfm?id=wireless-energy-lights-bulb-from-seven-feet-away,Jun. 7, 2007,1 page.
Minkel, J R. ,"Wireless Energy Transfer May Power Devices at a Distance",Scientific American,Nov. 14, 2006,1 page.
Morgan, J., "Lab report: Pull the plug for a positive charge", The Herald, Web Issue 2680, (Nov. 16, 2006) 3 pages.
Moskvitch, Katia, "Wireless charging—the future for electric cars?", BBC News Technology (See www.bbc.co.uk/news/technology-14183409) (dated Jul. 21, 2011).
O'Brien et al., "Analysis of Wireless Power Supplies for Industrial Automation Systems", IEEE, pp. 367-372 (Nov. 2-6, 2003).
O'Brien et al., "Design of Large Air-Gap Transformers for Wireless Power Supplies", IEEE, pp. 1557-1562 (Jun. 15-19, 2003).
Pendry, J. B., "A Chiral Route to Negative Refraction", Science, vol. 306:1353-1355 (2004).
Physics Today, "Unwired energy questions asked answered", Sep. 2007, pp. 16-17.
Powercast LLC. "White Paper" Powercast simply wire free, 2003.
PR News Wire, "The Big Story for CES 2007: The public debut of eCoupled Intelligent Wireless Power", Press Release, Fulton Innovation LLC, Las Vegas, NV, (Dec. 27, 2006) 3 pages.
Press Release, "The world's first sheet-type wireless power transmission system: Will a socket be replaced by e-wall?",Public Relations Office, School of Engineering, University of Tokyo, Japan,Dec. 12, 2006,4 pages.
PressTV, "Wireless power transfer possible", http://edition.presstv.ir/detail/12754.html, Jun. 11, 2007, 1 page.
Reidy, C. (Globe Staff), "MIT discovery could unplug your iPod forever", Boston.com, http://www.boston.com/ business/ticker/2007/06/mit_discovery_c.html, (Jun. 7, 2007) 3 pages.
Risen, C., "Wireless Energy", The New York Times, (Dec. 9, 2007) 1 page.
Sakamoto et al., "A Novel Circuit for Non-Contact Charging Through Electro-Magnetic Coupling", IEEE, pp. 168-174 (1992).
Scheible, G. et al., "Novel Wireless Power Supply System for Wireless Communication Devices in Industrial Automation Systems", IEEE, pp. 1358-1363, (Nov. 5-8, 2002).
Schneider, D. "A Critical Look at Wireless Power", *IEEE Spectrum*, pp. 35-39 (May 2010).
Schneider, David, "Electrons Unplugged. Wireless power at a distance is still far away", *IEEE Spectrum*, pp. 35-39 (May 2010).

(56) References Cited

OTHER PUBLICATIONS

Schuder, J. C. et al., "An Inductively Coupled RF System for the Transmission of 1 kW of Power Through the Skin", *IEEE Transactions on Bio-Medical Engineering*, vol. BME-18, No. 4, pp. 265-273 (Jul. 1971).
Schuder, J. C., "Powering an Artificial Heart: Birth of the Inductively Coupled-Radio Frequency System in 1960", *Artificial Organs*, vol. 26:909-915 (2002).
Schuder, J.C. et al., "Energy Transport Into the Closed Chest From a Set of Very-Large Mutually Orthogonal Coils", Communication Electronics, vol. 64:527-534 (Jan. 1963).
Schutz, J. et al., "Load Adaptive Medium Frequency Resonant Power Supply", IEEE, pp. 282-287 (Nov. 2002).
Sekitani et al. "A large-area wireless power-transmission sheet using printed organic transistors and plastic MEMS switches" www.nature.com/naturematerials. Published online Apr. 29, 2007.
Sekitani et al., "A large-area flexible wireless power transmission sheet using printed plastic MEMS switches and organic field-effect transistors", IEDM '06, International Electron Devices Meeting, (Dec. 11-13, 2006) 4 pages.
Sekiya, H. et al., "FM/PWM control scheme in class DE inverter", IEEE Trans. Circuits Syst. I, vol. 51(7) (Jul. 2004).
Senge, M., "MIT's wireless electricity for mobile phones", Vanguard, http://www.vanguardngr.com/articles/2002/features/gsm/gsm211062007.htm, (Jun. 11, 2007) 1 page.
Sensiper, S., "Electromagnetic wave propogation on helical conductors", Technical Report No. 194 (based on PhD Thesis), Massachusetts Institute of Technology, (May 16, 1951) 126 pages.
Soljacic, M. , "Wireless Non-Radiative Energy Transfer—PowerPoint presentation". Massachusetts Institute of Technology, (Oct. 6, 2005).
Soljacic, M. et al., "Wireless Energy Transfer Can Potentially Recharge Laptops Cell Phones Without Cords", (Nov. 14, 2006) 3 pages.
Soljacic, M. et al., "Photonic-crystal slow-light enhancement of nonlinear phase sensitivity", *J. Opt. Soc. Am B*, vol. 19, No. 9, pp. 2052-2059 (Sep. 2002).
Soljacic, M., "Wireless nonradiative energy transfer", *Visions of Discovery New Light on Physics, Cosmology, and Consciousness*, Cambridge University Press, New York, NY pp. 530-542 (2011).
Someya, Takao. "The world's first sheet-type wireless power transmission system". University of Tokyo, (Dec. 12, 2006).
Staelin, David H. et al., Electromagnetic Waves, Chapters 2, 3, 4, and 8, pp. 46-176 and 336-405 (Prentice Hall Upper Saddle River, New Jersey 1998).
Stark III, Joseph C., "Wireless Power Transmission Utilizing a Phased Array of Tesla Coils", Master Thesis, Massachusetts Institute of Technology (2004).
Stewart, W., "The Power to Set you Free", Science, vol. 317:55-56 (Jul. 6, 2007).

Tang, S.C. et al., "Evaluation of the Shielding Effects on Printed-Circuit-Board Transformers Using Ferrite Plates and Copper Sheets", *IEEE Transactions on Power Electronics*, vol. 17:1080-1088 (Nov. 2002).
Tesla, Nikola, "High Frequency Oscillators for Electro-Therapeutic and Other Purposes", *Proceedings of the IEEE*, vol. 87:1282-1292 (Jul. 1999).
Tesla, Nikola, "High Frequency Oscillators for Electro-Therapeutic and Other Purposes", *The Electrical Engineer*, vol. XXVI, No. 50 (Nov. 17, 1898).
Texas Instruments, "HF Antenna Design Notes—Technical Application Report," Literature No. 11-08-26-003, 47 pages (Sep. 2003).
Thomsen et al., "Ultrahigh speed all-optical demultiplexing based on two-photon absorption in a laser diode," Electronics Letters, 34(19):1871-1872 (Sep. 17, 1998).
UPM Rafsec, "Tutorial overview of inductively coupled RFID Systems," 7 pages (May 2003).
Valtchev et al. "Efficient Resonant Inductive Coupling Energy Transfer Using New Magnetic and Design Criteria". IEEE, pp. 1293-1298, 2005.
Vandevoorde et al., "Wireless energy transfer for stand-alone systems: a comparison between low and high power applicability", Sensors and Actuators, vol. 92:305-311 (2001).
Vilkomerson, David et al., "Implantable Doppler System for Self-Monitoring Vascular Grafts", *IEEE Ultrasonics Symposium*, pp. 461-465 (2004).
Villeneuve, Pierre R. et al., "Microcavities in photonic crystals: Mode symmetry, tunability, and coupling efficiency", *Physical Review B*, vol. 54:7837-7842 (Sep. 15, 1996).
Yariv, Amnon et al., "Coupled-resonator optical waveguide: a proposal and analysis", *Optics Letters*, vol. 24(11):711-713 (Jun. 1, 1999).
Yates, David C. et al., "Optimal Transmission Frequency for Ultralow-Power Short-Range Radio Links", IEEE Transactions on Circuits and Systems—1, Regular Papers, vol. 51:1405-1413 (Jul. 2004).
Yoshihiro Konishi, *Microwave Electronic Circuit Technology*, Chapter 4, pp. 145-197 (Marcel Dekker, Inc., New York, NY 1998).
Ziaie, Babak et al., "A Low-Power Miniature Transmitter Using a Low-Loss Silicon Platform for Biotelemetry", *Porceedings—19th International Conference IEEE/EMBS*, pp. 2221-2224, (Oct. 30-Nov. 2, 1997) 4 pages.
Zierhofer, Clemens M. et al., "High-Efficiency Coupling-Insensitive Transcutaneous Power and Data Transmission Via an Inductive Link", *IEEE Transactions on Biomedical Engineering*, vol. 37, No. 7, pp. 716-722 (Jul. 1990).
International Search Report and Written Opinion for International Application No. PCT/US2015/068291 dated Mar. 15, 2016 (11 pages).
International Preliminary Report on Patentability and Written Opinion of the International Searching Authority for International Application No. PCT/US2015/068291 dated Jul. 20, 2017 (8 pages).

\* cited by examiner

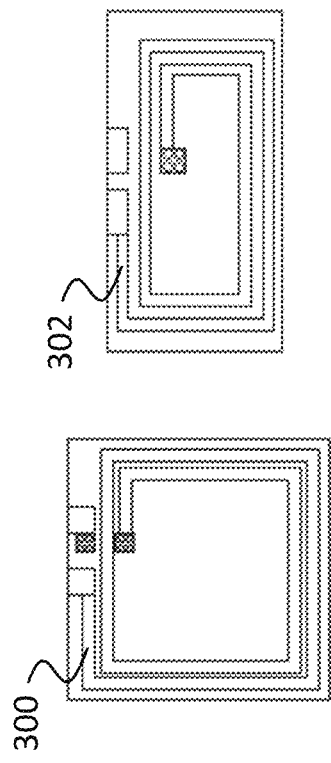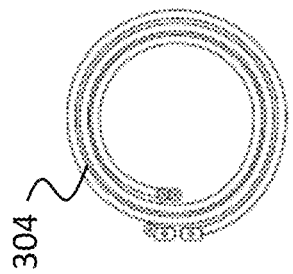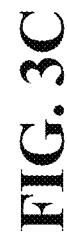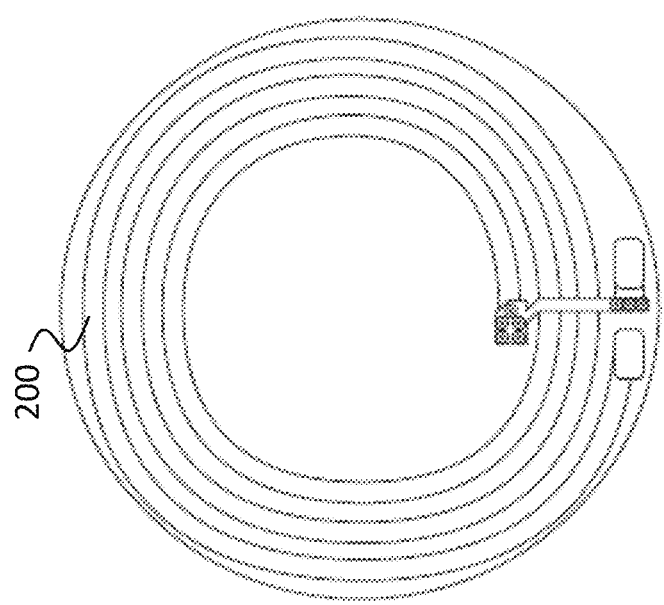
FIG. 3A
FIG. 3B
FIG. 3C
FIG. 2

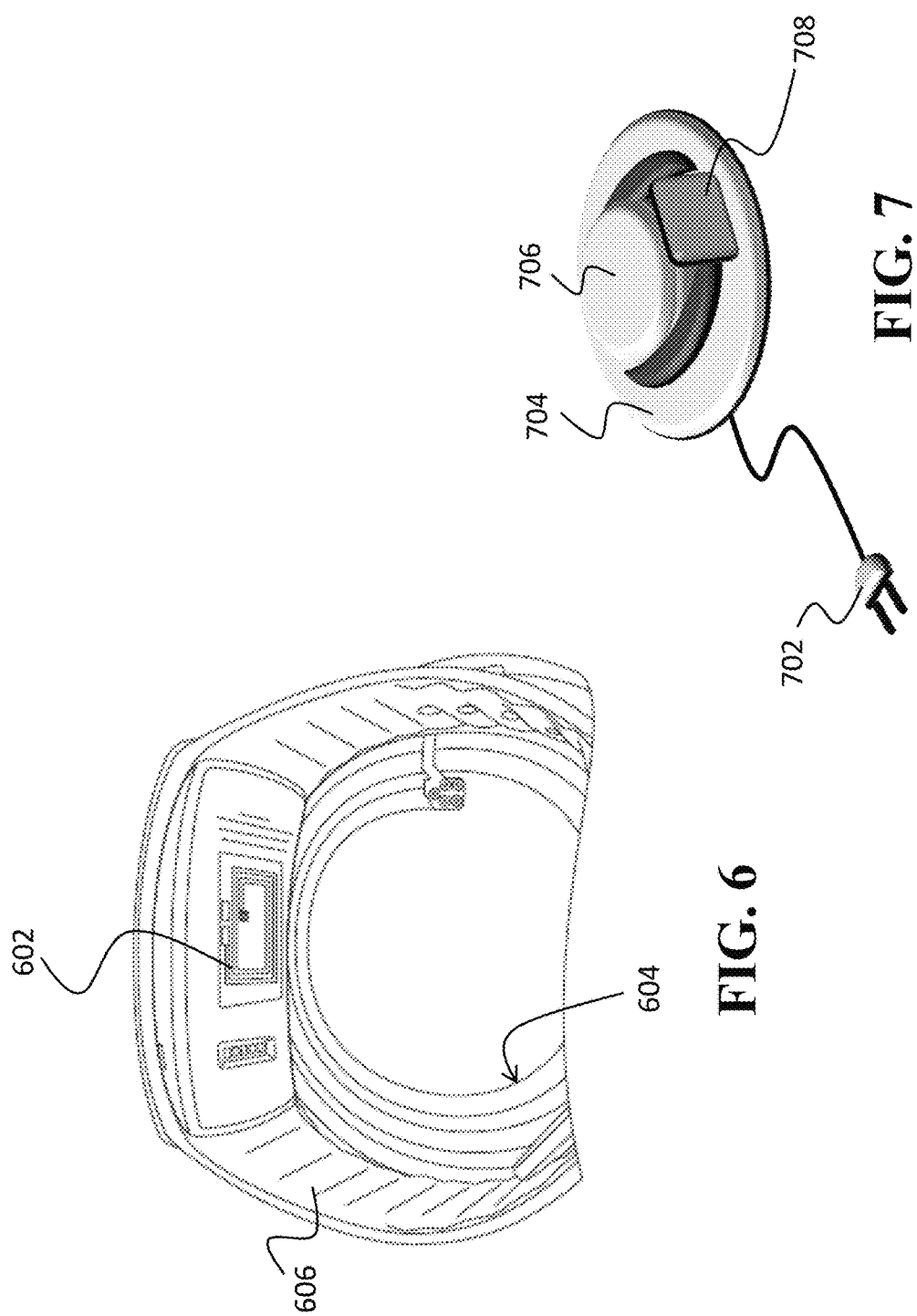

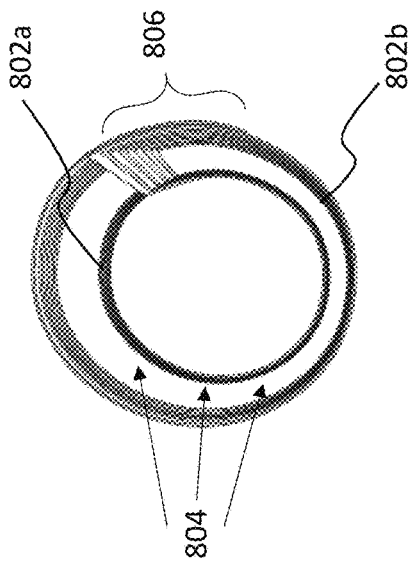
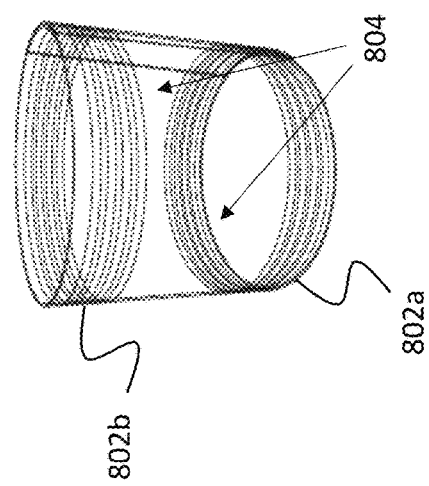
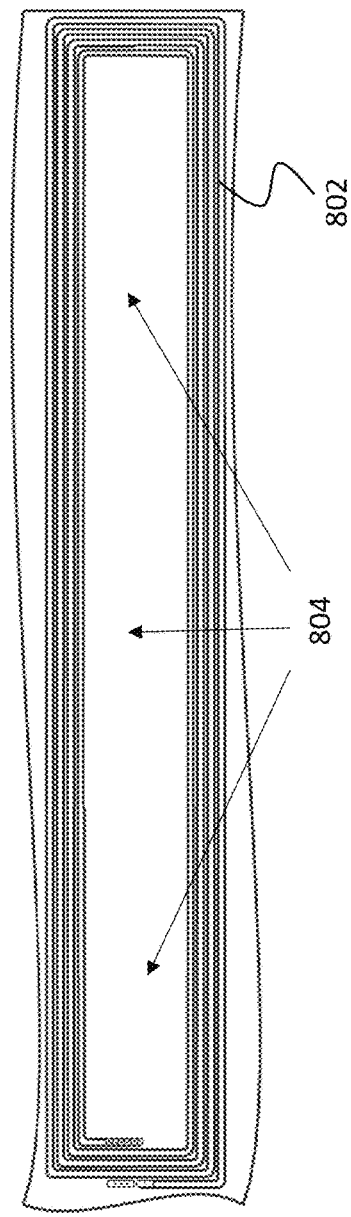
FIG. 8A
FIG. 8B
FIG. 8C

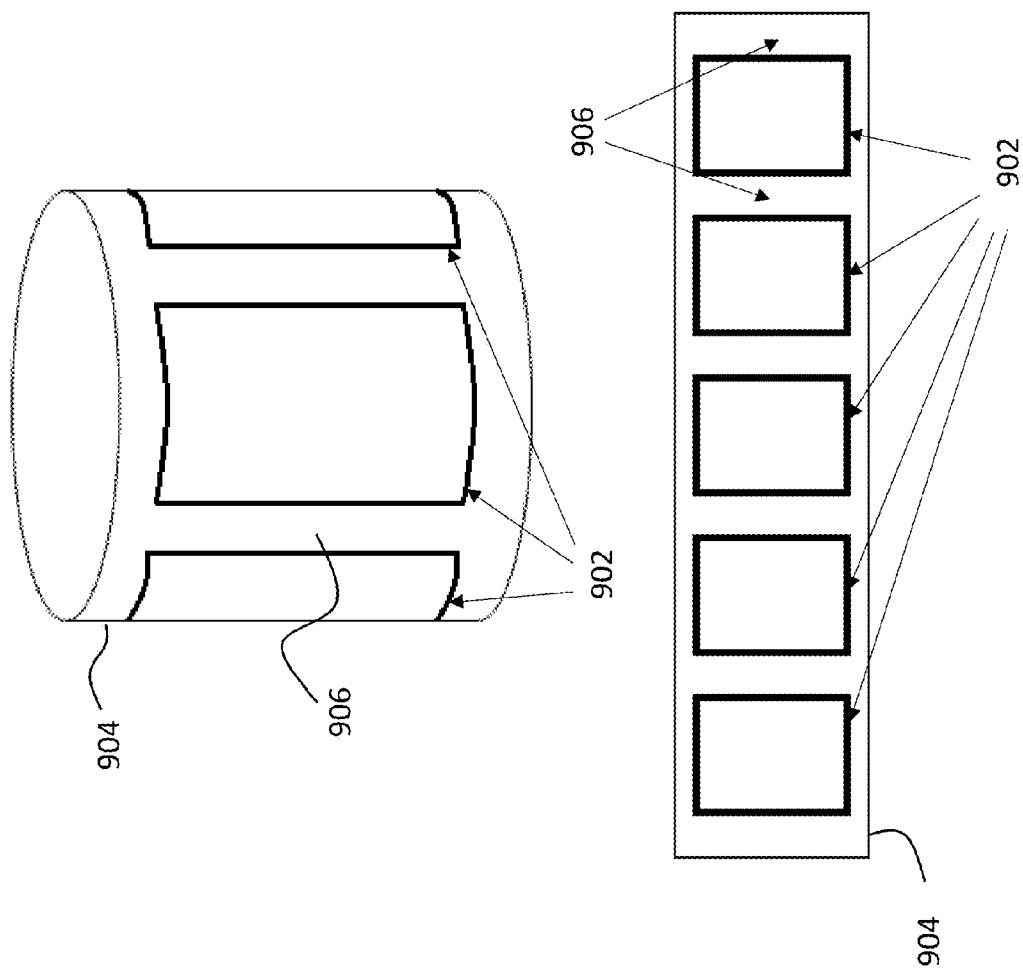

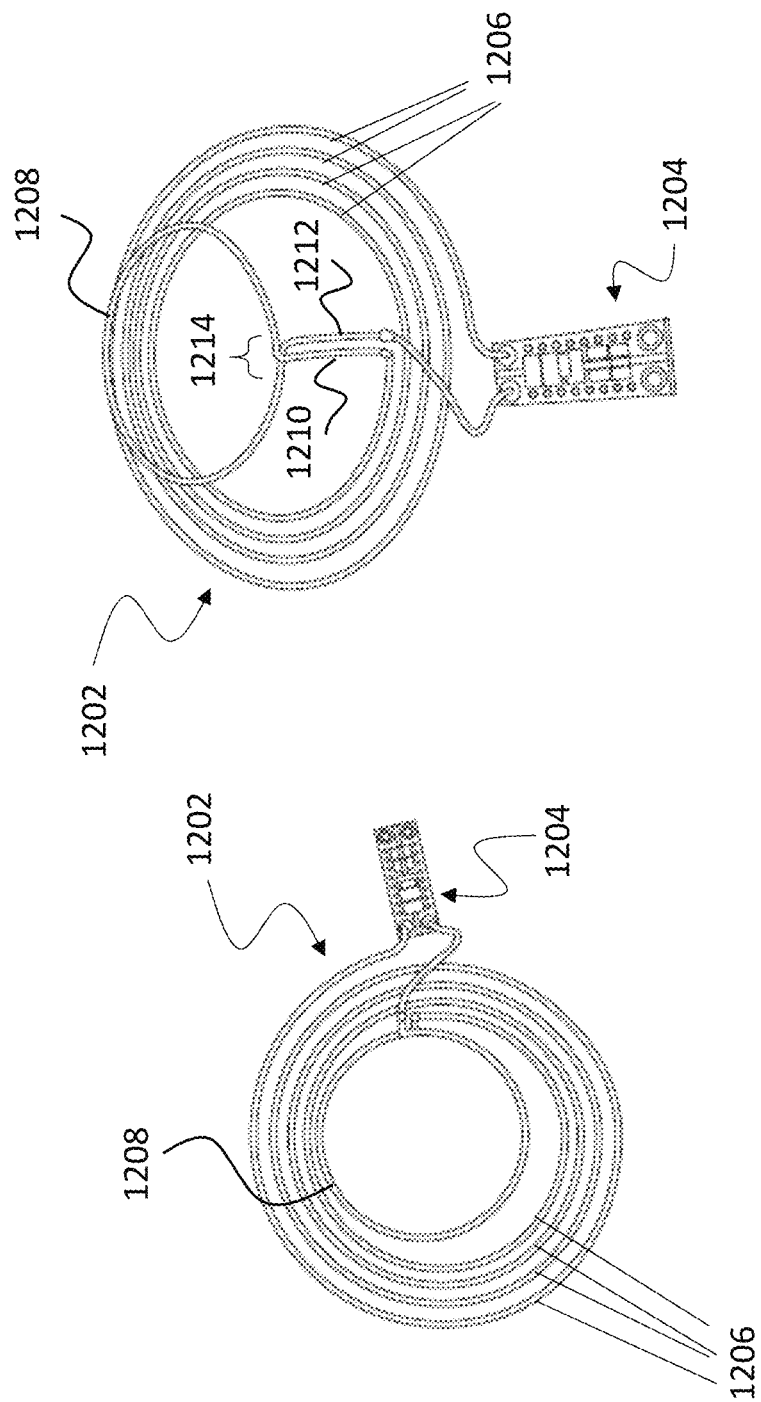

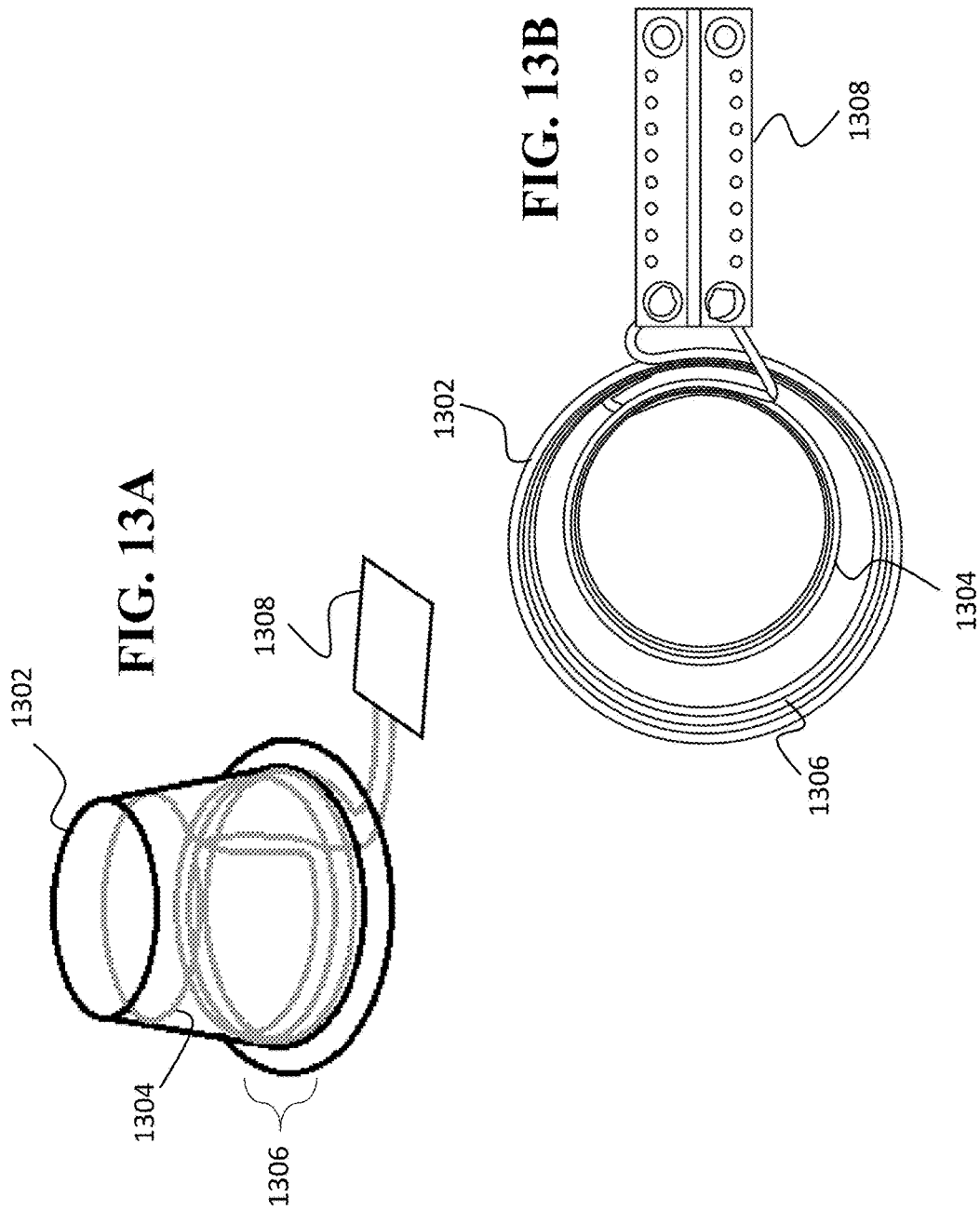

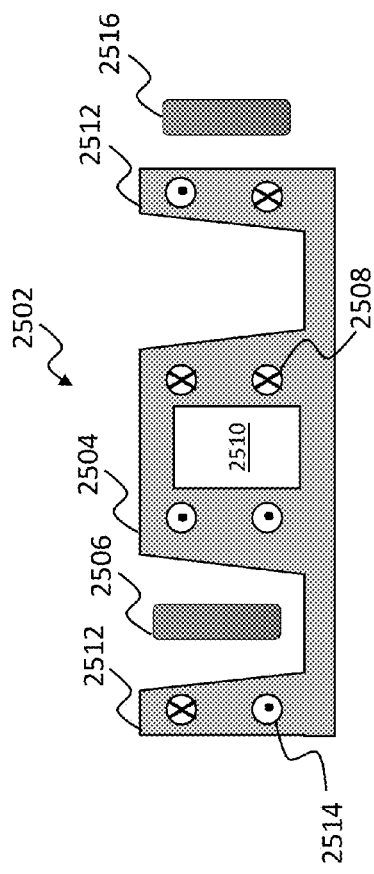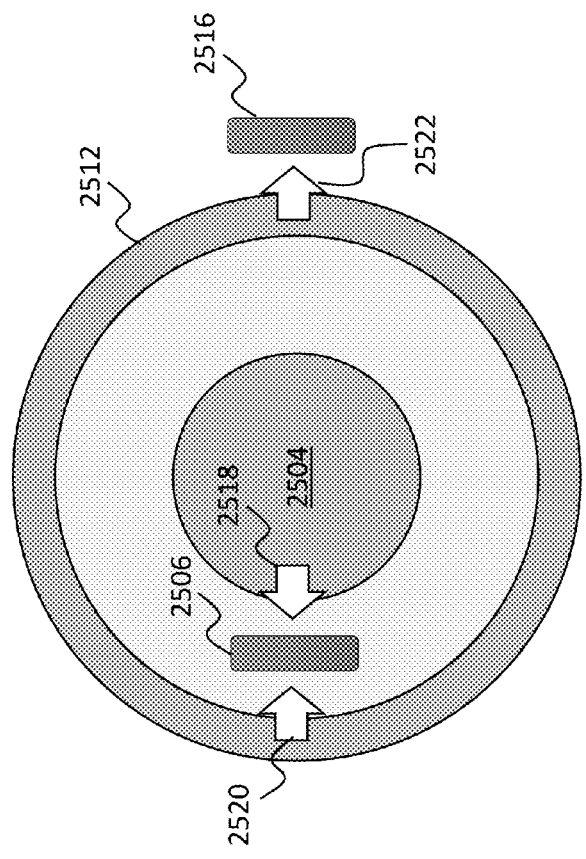
FIG. 25A
FIG. 25B

WIRELESS ENERGY TRANSFER FOR WEARABLES

CROSS-REFERENCE TO RELATED APPLICATIONS

This application claims priority to U.S. Provisional Patent Application No. 62/099,933, filed on Jan. 5, 2015 and U.S. Provisional Patent Application No. 62/138,794, filed on Mar. 26, 2015, the entire contents of each of which are incorporated by reference herein.

TECHNICAL FIELD

This disclosure relates to wireless energy transfer systems.

BACKGROUND

Energy can be transferred from a power source to a receiving device using a variety of known techniques such as radiative (far-field) techniques. For example, radiative techniques using low-directionality antennas can transfer a small portion of the supplied radiated power, namely, that portion in the direction of, and overlapping with, the receiving device used for pick up. In such methods, much—even most—of the energy is radiated away in directions other than the direction of the receiving device, and typically the transferred energy is insufficient to power or charge the receiving device. In another example of radiative techniques, directional antennas are used to confine and preferentially direct the radiated energy towards the receiving device. In this case, an uninterruptible line-of-sight and potentially complicated tracking and steering mechanisms are used.

Another approach to energy transfer is to use non-radiative (near-field) techniques. For example, techniques known as traditional induction schemes do not (intentionally) radiate power, but use an oscillating current passing through a primary coil, to generate an oscillating magnetic near-field that induces currents in a nearby receiving or secondary coil. Traditional induction schemes can transfer modest to large amounts of power over very short distances. In these schemes, the offset tolerances between the power source and the receiving device are very small. Electric transformers and proximity chargers, for example, typically use traditional induction schemes.

SUMMARY

In a first aspect, the disclosure features wireless energy transfer systems to wirelessly charge wearable electronic devices. The systems can include a source which can have a source resonator. The source can be configured to generate a first magnetic field with a first magnetic field direction and a first magnetic field amplitude. The systems can include a repeater which can have a repeater resonator. The repeater can be configured to convert the first magnetic field to a second magnetic field with a second magnetic field direction and a second magnetic field amplitude. The first magnetic field direction can be different from the second magnetic field direction and the first magnetic field amplitude can be different from the second magnetic field amplitude.

Embodiments of the systems can include any one or more of the following features.

The quality factors of the source resonator and repeater resonator can be greater than 100. The repeater resonator can include a first number of conductive wire loops in a first plane and a second number of conductive wire loops in a second plane. The first and second planes can be substantially parallel to one another and have a non-zero distance between them.

The repeater resonator can have a substantially cylindrical shape with an upper end and a lower end. The repeater resonator can further include a first number of conductive wire loops in the upper end and second number of conductive wire loops in the lower end. The upper end of the cylindrical shape can have a smaller diameter than the lower end of the cylindrical shape.

The source and repeater can each have a communication and control circuitry. The source and repeater can establish a communication channel to initiate wireless power transfer to the wearable electronic device. The repeater can include a tunable resonator. The tunable resonator can be configured to be tuned depending on the position of the repeater relative to the source. The tunable resonator can be configured to be detuned depending on the position of the repeater relative to the source.

Embodiments of the systems can also include any of the other features disclosed herein, including features disclosed in connection with different embodiments, in any combination as appropriate.

In another aspect, the disclosure features wireless power sources to transfer power to a wireless power device that include a device resonator having a dimension. Sources can include a source resonator, the source resonator can include a conductor having a first plurality of windings wound in a first plane and second plurality of windings wound in a second plane. The first plane and second plane can be spaced apart and substantially parallel. The separation between the first plane and second plane can be approximately equal to or greater than the dimension of the device resonator coil.

In another aspect, the disclosure features wireless power transfer systems that include a source resonator. The source resonator can include a first conductor having a first plurality of windings wound in a first plane and a second plurality of windings in a second plane. The system can include a device resonator including a second conductor having a third plurality of windings wound in a third plane, the second conductor having a dimension. The first plane and second plane can be spaced apart and substantially parallel. The separation between the first plane and second plane can be approximately equal to or greater than the dimension of the second conductor of the device resonator.

Embodiments of the systems can include any one or more of the following features.

The second conductor can include copper, copper-clad aluminum, or Litz wire. The second plurality of windings can include at least three turns in the second plane and the third plurality of windings can include at least three turns in the third plane. The device resonator can include a third plurality of windings wound in a third plane and a length of an outermost winding of the third plurality of windings defines the dimension. The length can be a largest dimension of the outermost winding of the first plurality of windings.

The systems can include a piece of magnetic material is disposed on a bottom surface of the second conductor wound in the second plane. The systems can include a piece of magnetic material is disposed on a top surface of the second conductor wound in the third plane. The second conductor can be coupled to a matching network.

Embodiments of the systems can also include any of the other features disclosed herein, including features disclosed in connection with different embodiments, in any combination as appropriate.

In another aspect, the disclosure features wireless power sources that include a source resonator including a conductor having a plurality of windings wound primarily in a cylindrical shape. The cylindrical shape can have a curved face, a first end, and a second end. The first subset of the plurality of windings can be concentrated on the curved face closest to the first end and a second subset of the plurality of windings can be concentrated on the curved face closest to the second end of the cylindrical shape. The second subset of the plurality of windings can be further formed on the second end of the cylindrical shape.

Embodiments of the sources can include any one or more of the following features.

The first plurality of windings can be spaced to define 0.5 mm or greater air gap between each of the first subset of the plurality of windings. The second subset plurality of windings are spaced to define 0.5 mm or greater air gap between each of the first subset of the plurality of windings. The separation between the first plurality and second plurality of windings can be equal or greater than a dimension of device resonator coil.

Embodiments of the sources can also include any of the other features disclosed herein, including features disclosed in connection with different embodiments, in any combination as appropriate.

In another aspect, the disclosure features resonators to wirelessly transfer energy to a wireless power device including a device resonator coil having a dimension D. The resonators can include a first plurality of conductor windings wound approximately in a first plane and having first and second conductor leads, and a second plurality of conductor windings wound in a second plane and having third and fourth conductor leads. The first and third conductor leads can be coupled to each other and the second and the fourth conductor leads can be coupled to at least one capacitor. The first plane and second plane can be spaced apart by separation S and substantially parallel. The separation S between the first plane and second plane can be approximately equal to or greater than the dimension D of the device resonator coil.

Embodiments of the resonators can include any one or more of the following features.

The resonators, when driven with an oscillating current, can generate an oscillating electromagnetic field. The first plurality of conductor windings can have a first dipole and the second plurality of conductor windings can have a second dipole and the normal components of the first and second dipole moments can cancel each other. The electromagnetic field can have a radial dipole through the separation S.

The first and second plurality of conductor windings can include copper, copper-clad aluminum, or Litz wire. The first and second plurality of conductor windings can each include at least three turns. A length of an outermost winding of a third plurality of windings of the device resonator coil can define the dimension D. A first piece of magnetic material can be disposed on a bottom surface of the first conductor wound in the first plane. A second piece of magnetic material can be disposed on a top surface of the second conductor wound in the second plane.

The resonators can be a repeater resonator and wherein the first and second plurality of conductor windings can be wound in a same direction. The resonators can be a source resonator and wherein the first and second plurality of conductor windings can be wound in different directions.

A first portion of the first plurality of conductor windings can be positioned above the first plane. A second portion of the first plurality of conductor windings can be positioned below the first plane. A third portion of the first plurality of conductor windings can be positioned in the first plane. A first portion of the second plurality of conductor windings can be positioned above the second plane. A second portion of the second plurality of conductor windings can be positioned below the second plane. A third portion of the second plurality of conductor windings can be positioned in the second plane.

At least one of the first or second plurality of conductor windings can form a stacked ring. At least one of the first or second plurality of conductor windings can form a cylindrical shape.

Embodiments of the resonators can also include any of the other features disclosed herein, including features disclosed in connection with different embodiments, in any combination as appropriate.

In another aspect, the disclosure features wireless power transfer systems that can include a source resonator. The source resonator can include a first plurality of conductor windings wound in a first plane and having first and second conductor leads, and a second plurality of conductor windings wound in a second plane and having third and fourth conductor leads. The systems can include a device resonator including a third plurality of conductor windings wound in a third plane having a dimension D. The first and third conductor leads can be coupled to each other and the second and the fourth conductor leads can be coupled to at least one capacitor. The first plane and second plane can be spaced apart by separation S and substantially parallel. A separation S between the first plane and second plane can be approximately equal to or greater than the dimension D of the device resonator coil.

Embodiments of the systems can include any one or more of the following features.

The first and second plurality of conductor windings can be disposed along an inner surface of a housing, the housing comprising non-conductive material. The first and second plurality of conductor windings can contact the inner surface of the housing.

Embodiments of the systems can also include any of the other features disclosed herein, including features disclosed in connection with different embodiments, in any combination as appropriate.

BRIEF DESCRIPTION OF THE DRAWINGS

FIG. 2 shows an exemplary embodiment of a source resonator coil.

FIGS. 3A-3C show exemplary embodiments of device resonator coils.

FIG. 6 shows an exemplary embodiment of a source resonator coil and device resonator coil disposed on a wearable electronic device.

FIG. 7 shows a model of an exemplary embodiment of a source shape to wirelessly power or charge a wearable electronic device.

FIGS. 8A-8B show a perspective and top view, respectively, of a folded or curled form of an exemplary embodiment of a source resonator coil. FIG. 8C shows an unfolded or uncurled form of an exemplary embodiment of a source resonator coil.

FIG. 9A shows a perspective view of a folded or curled form of an exemplary embodiment of multiple source resonator coils on a substrate. FIG. 9B shows an unfolded or uncurled form of an exemplary embodiment of multiple source resonator coils on a substrate.

FIGS. 12A-12B show a top and perspective view of an exemplary embodiment of a resonator for a wireless energy transfer system.

FIGS. 13A-13B show perspective and bottom views of an exemplary embodiment of a resonator for a wireless energy transfer system.

FIGS. 25A-25B show cross-sectional and top views, respectively, of an exemplary embodiment of a wireless power source.

DETAILED DESCRIPTION

Energy or power may be transferred wirelessly using a variety of known radiative, or far-field, and non-radiative, or near-field, techniques as detailed, for example, in commonly owned U.S. patent application Ser. No. 12/613,686 published on May 6, 2010 as US 2010/010909445 and entitled "Wireless Energy Transfer Systems," U.S. patent application Ser. No. 12/860,375 published on Dec. 9, 2010 as 2010/0308939 and entitled "Integrated Resonator-Shield Structures," U.S. patent application Ser. No. 13/222,915 published on Mar. 15, 2012 as 2012/0062345 and entitled "Low Resistance Electrical Conductor," U.S. patent application Ser. No. 13/283,854 published on Oct. 4, 2012 as US 2012/0248887 and entitled "Multi-Resonator Wireless Energy Transfer for Sensors," and U.S. patent application Ser. No. 13/534,966 published on Jan. 2, 2014 as US 2014/0002012 and entitled "Wireless Energy Transfer for Rechargeable Batteries," the contents of each of which are incorporated by reference.

In exemplary embodiments, a wireless energy transfer system may be configured to transfer energy directly to, or charge a battery of, a wearable electronic device. Wearable electronic devices include watches, smartwatches, Bluetooth headsets, activity trackers (such as a FitBit), wearable electronics and electronic eyewear (such as Google Glass), electronic jewelry, and the like. In exemplary embodiments, a wearable electronic device may comprise one or more device resonators and device electronics.

Figure 1:
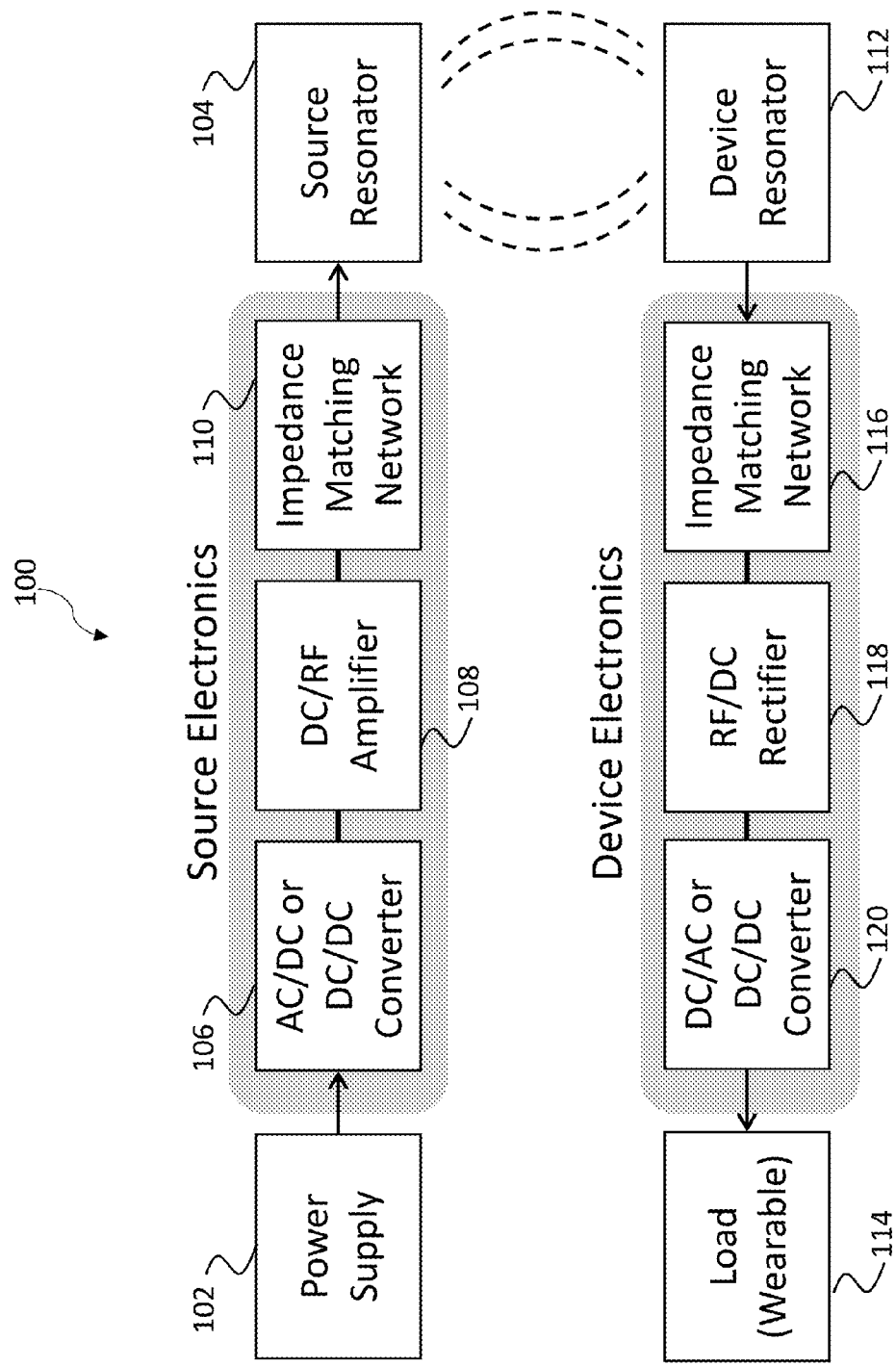
FIG. 1 shows a diagram of an exemplary embodiment of a wireless energy transfer system for a wearable electronic device.

FIG. 1 shows a diagram of an exemplary embodiment of a wireless energy transfer system 100 for a wearable electronic device. In the direction of the arrows in the diagram, a power supply 102 provides power to the source electronics which is coupled to the source resonator 104. A power supply may be AC mains, a battery, a solar cell, and the like. The source electronics may include a converter 106 (depending on the power supply), an amplifier 108, and an impedance matching network 110. The source resonator 104 wirelessly transfers power to a device resonator 112 via an oscillating magnetic field. Power ultimately reaches the load 114 of the wearable electronic device via the device electronics. The device electronics may include an impedance matching network 116, a rectifier 118, and a converter 120. Power may be transmitted directly to the wearable or to a battery of the wearable. In exemplary embodiments, the wearable electronic device may require power levels of 0.25 W or greater, 0.5 W or greater, 1 W or greater, 2 W or greater, or more. The battery of a wearable electronic device may have a capacity of 100 mAh or greater, 300 mAh or greater, or more. In embodiments, the resonant and/or operating frequency of the wireless power transfer system for a wirelessly powered wearable may be 1 MHz or greater, 3 MHz or greater, or more. In embodiments, the resonant and/or operating frequency of the wireless power transfer system may be 6.78 MHz or 100-250 kHz. In exemplary embodiments, the source and/or device electronics may include control circuitry to tune or otherwise vary any of the components of either the source or device. For example, control circuitry may be used to tune the impedance matching network of either the source or device. In another example, control circuitry may be used to vary the power level at the source according to the power draw at the device. In exemplary embodiments, much of the control may be implemented on the source side of the wireless energy transfer system due to the space constraints of an electronics board for a wearable electronic device.

Source and device resonators each include at least one resonator coil and at least one capacitor. FIG. 2 shows an example of a source resonator coil 200. FIG. 2 shows an exemplary embodiment of a source resonator coil with an outer diameter of approximately 70 mm and is made of copper. In embodiments, a source resonator coil may be made of copper, aluminum, copper-clad wire and the like and may be printed or made of solid wire. FIGS. 3A-3B show examples of device resonator coils 300, 302, 304. In exemplary embodiments, the device resonator coil of a device resonator may be disposed on or integrated into a wearable electronic device. In embodiments, the device resonator coil can be positioned on or in a band or housing of the wearable device (e.g. in the housing, back or band of a watch or fitness tracker).

Device resonator coils can be shaped and sized to fit in the back of a watch. FIG. 3A shows an approximately square device resonator coil of dimensions 20 mm by 20 mm. FIG.

3B shows a rectangular device resonator coil of dimensions 10 mm by 20 mm. FIG. 3C shows an approximately round or circular device resonator coil having a diameter of approximately 20 mm. The foregoing embodiments of resonator coils may be made of copper, aluminum, copper-clad wire and the like and may be printed or made of solid wire. In embodiments, it may be desirable or beneficial that the profile of the resonator coil be small such that it does not add bulk or thickness to a wearable device. For example, the device resonator coils shown in FIG. 3A-3C are printed conductive traces (including the substrate thickness) having a thickness of 1 mm or less. In embodiments, the thickness of a resonator coil may be 5 mm, 3 mm, or less.

In exemplary embodiments, the device resonator coil may wrap around the edges of a face of a watch. In other embodiments, the device resonator coil can be positioned on or in the wristband of a watch.

Pad-Shaped Source

Figure 4B:
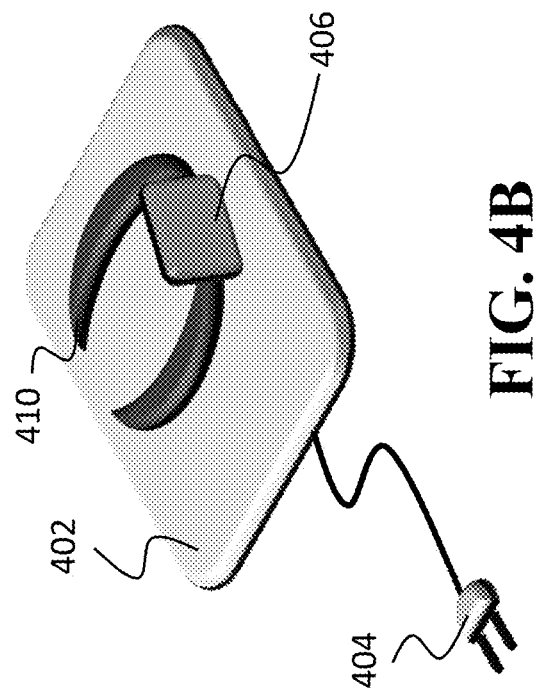
FIGS. 4A-4B show models of exemplary embodiments of a wireless energy transfer system for a wearable electronic device.
Figure 4A:
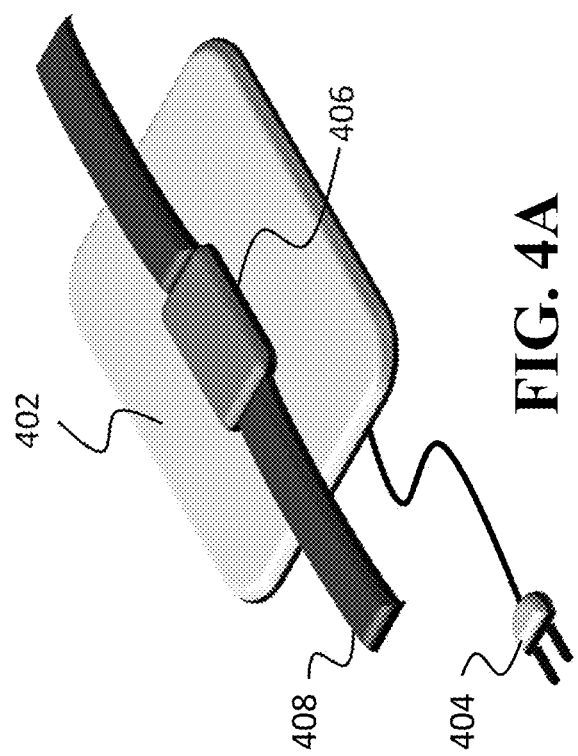

In exemplary embodiments, a wireless power source may take several forms depending on the type of wearable device to be wirelessly charged or powered. FIG. 4A shows an exemplary embodiment of a wireless power source shaped as a pad 402 that draws power from a power supply such as AC mains 404, a battery, a solar cell, and the like. The source pad 402 provides a flat structure on which to place a wirelessly powered device, such as the watch shown. The watch includes a watch face 406 and wrist band 408. In embodiments, the wrist band may not lie flat as shown in FIG. 4A. For example, as shown in FIG. 4B, wrist band 410 may be clasped in some configurations or may be mechanically built such that it cannot lie flat. In embodiments, a source resonator coil in a source pad may comprise a conductive trace that winds in a plane. For example, such a source resonator coil is shown in FIG. 2. In some embodiments, the wireless power source is the WiT-5000 available from WiTricity Corporation (Watertown, Mass.).

Figure 5:
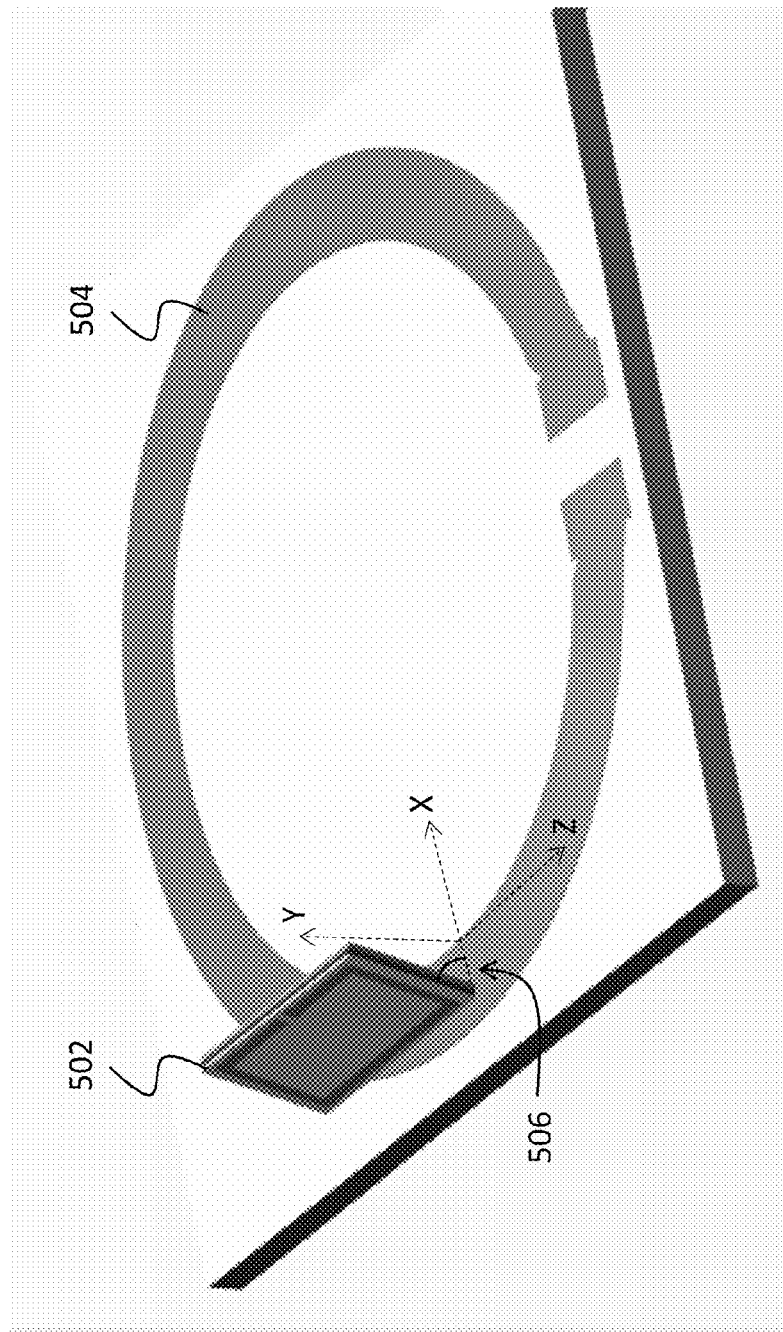
FIG. 5 shows a model of an exemplary embodiment of a source and device resonator in a wireless energy transfer system.

Some wearable devices may not naturally lie flat on a pad-shaped wireless power source as shown in FIG. 4A, but rather preferentially sit with the device face in a more upright position as shown in FIG. 4B. In exemplary embodiments, a planar source resonator coil, such as that shown in FIG. 2, housed in a source pad 402 may also be able to transfer power efficiently to a device resonator coil that is positioned in this manner. For example, for a device resonator coil (such as those in FIG. 3A-3C) on the back of a watch face 406, coupling between the two resonators coils may be high or sufficient enough to achieve an acceptable efficiency. An acceptable efficiency may be greater than 5%, greater than 10%, greater than 20%, or more. As shown in FIG. 4B and FIG. 5, a source resonator may be able to transfer power to a device resonator coil that is offset from the center of the source resonator coil and at an angle to the source resonator coil at an acceptable efficiency. FIG. 5 shows positioning of an exemplary embodiment of a device resonator 502 with respect to a source resonator 504. In this embodiment, the device resonator 502 may be positioned along the side traces of the coil of source resonator 504 at the angle 506 with respect to the plane of the coil of source resonator 504. A housing containing the source resonator may be shaped in such a way so that the device resonator is naturally positioned in this manner. In one embodiment the housing in the middle of the source resonator may be higher so that wearable sits around it. For the source resonator 504 shown in FIG. 5, the general dipole moment extends approximately orthogonal to the plane of the resonator coil, namely the dipole moment is in the Y direction (using the Cartesian coordinates provided in FIG. 5). However, above the surface of the resonator coil and away from the center, the magnetic flux does have a component in the YZ plane which also couples to the device resonator coil.

FIG. 6 shows an exemplary embodiment of a device resonator 602 disposed on a smartwatch positioned on a source resonator 604. Note that the wristband 606 of the smartwatch can prop and/or orient the face of the watch such that the device resonator is positioned as described above in FIG. 5. In certain embodiments, the device resonators shown in FIG. 6 can be disposed in the housing or band of the wearable electronic device shown.

Top Hat-Shaped Source

FIG. 7 shows an exemplary embodiment of a wireless power source. The source may be coupled to a power supply 702 such as AC mains, a battery, a solar cell, and the like. The mechanical housing 704 and 706 of the source is shaped such that a wearable device (e.g. a smartwatch or fitness tracker) 708 can be positioned for wireless charging as shown. The housing includes primarily of two portions: a bottom portion 704 of the source housing holds the wearable 708 against and/or around the top portion 706 of the source housing. For example, the wearable 708 can wrap around the top portion 706. The housing may contain one or more source resonators to transfer power to a device resonator of the wearable electronic device. In certain embodiments, the top portion 706 can have a substantially circular or elliptical cross-section. The top portion 706 can have a conical, truncated conical, tapered, or cylindrical shape.

FIGS. 8A-8B show perspective and top views of an exemplary embodiment of a resonator coil that may be fitted into the top portion 706 of the source housing shown in FIG. 7. The shown resonator coil is made of 2 ounce copper and is approximately 300 mm in length when unfurled (as shown in FIG. 8C). The shown resonator coil can be constructed by folding or wrapping the planar resonator coil 802 shown in FIG. 8C into a substantially cylindrical shape. The cylindrical shape may have a height of approximately 40 mm and a diameter of approximately 43 mm. The resonator coil 802 has a general magnetic dipole moment orthogonal to the plane of the resonator and extends from the central area 804. When the resonator coil in FIG. 8C is bent or folded to create the substantially cylindrical shape shown in FIGS. 8A-8B, the magnetic flux is generated in the radial direction from the center portion of the cylinder through the area 804 between the bottom 802a and top 802b conducting traces. In embodiments, there may be some or no overlap 806 in the cylindrical form of the resonator coil 802 (as shown in FIGS. 8A-8B). The overlap region 806 may be useful in controlling or diminishing the region of reduced radial flux caused by cancelling currents in the overlapping traces. A region of reduced radial magnetic flux may lead to a null region with little or no magnetic coupling between the source and device resonator coils. Another aspect of the cylindrical resonator coil 802 that may be optimized is the span of conductive traces that make up the resonator coil. In embodiments, a smartwatch, fitted with a device resonator coil behind the face of the watch, may sit near the bottom span 802a of the cylindrical resonator. There may also exist a null at the span 802a, which in turn can decrease the efficiency of power transfer to a device resonator placed nearby. In exemplary embodiments, the top portion 706 of the source housing may house embodiments of source resonator coils other than the exemplary embodiment described above in FIGS. 8A-8C.

FIG. 9A shows an exemplary embodiment of source resonator coils that may be fitted into the top portion 706 of the source housing shown in FIG. 7. In this embodiment, one or more source resonator coils 902 are shaped into "windows" or "frames" positioned in a row on substrate 904. FIG. 9B shows an unfolded substrate 904 on which source resonator coils 902 are printed. The source resonator coils 902 may be of similar size and shape. In embodiments, the source resonator coils 902 may be electrically coupled together and driven by one or more amplifiers. In other embodiments, the source resonator coils 902 may be driven separately by one or more amplifiers. In other embodiments, the driving of source resonator coils 902 may vary in time, frequency, and the like. In embodiments, nulls may be formed in the spaces 906 between the conductive traces of neighboring resonator coils. This issue may be mitigated by decreasing the spaces 906 or overlapping the source resonator coils 902. In embodiments, the reflected impedance can be measured at each of the source resonator coils "windows" to detect the window or windows that the device is best positioned to receive power. For example, "best position" may be determined by efficiency of power transfer of greater than 40%, 50%, or more. In another example, "best position" may be determined by degree of coupling between the source and device resonator coils. In embodiments, the source resonator coils can be "cycled" through by switching in (and out) a power supply in turn and power draw can be measured at each coil to determine the device position. In embodiments, the device may be able to communicate its position by modulating the power signal or by out-of-band communication such as Bluetooth, WiFi, etc.

Repeaters

In exemplary embodiments, a repeater resonator may be used to wirelessly transfer power from a wireless power source to a wearable electronic device. For discussion and examples on repeaters, please see at least the following commonly-owned applications: U.S. patent application Ser. No. 13/283,854 published on Oct. 4, 2012 as US 2012/0248887 and entitled "Multi-Resonator Wireless Energy Transfer for Sensors," U.S. patent application Ser. No. 13/944,693 published on Jan. 23, 2014 as US 2014/0021798 and entitled "Wireless energy source," and U.S. patent application Ser. No. 14/199,083 published on Sep. 18, 2014 as US 2014/0265617 and entitled "Wireless energy transfer". Note that the exemplary embodiments of resonators provided for repeaters may also be employed as resonators for sources. In embodiments, an advantage to having a repeater in a wireless energy transfer system may be the ability to use a source (e.g. a WiT-5000), configured to transfer power to a device designed to receive power using one magnetic field direction and amplitude, to transfer power (via the repeater) to a wirelessly powered wearable that is designed to receive power from a different magnetic field direction and amplitude. The magnetic field created by the repeater may be in a different direction and have an amplitude that is either larger or smaller than the magnetic field from the existing source. For example, a user may already have a wireless power source pad designed to create a magnetic field in a region above the pad that has a certain amplitude and a direction that is largely perpendicular to the plane of the source pad. A wearable device placed in this region may not charge because the magnetic field generated by the source pad has an amplitude that is too high, potentially damaging the wearable device, or too low or is in a direction that does not couple sufficiently to the resonator coil on the wearable device. A repeater may be used to modify the magnetic field produced by the source pad (in amplitude and/or direction) in order to deliver power safely to the wearable device.

Another advantage of using a repeater in the wireless energy transfer system is that the repeater may also be used to charge the wearable while an existing source resonator is simultaneously transferring power to other devices. For example, a user may already have a wireless power source that is able to transfer 5 W or more of power to electronic devices that are placed on top or above it. The repeater may be designed to operate when placed beside the source pad, above the source pad, below the source pad, or in another region of reduced magnetic field, capturing enough magnetic flux to deliver power wirelessly to a wearable device while simultaneously transferring power to other devices placed on the wireless power source.

Figure 11:
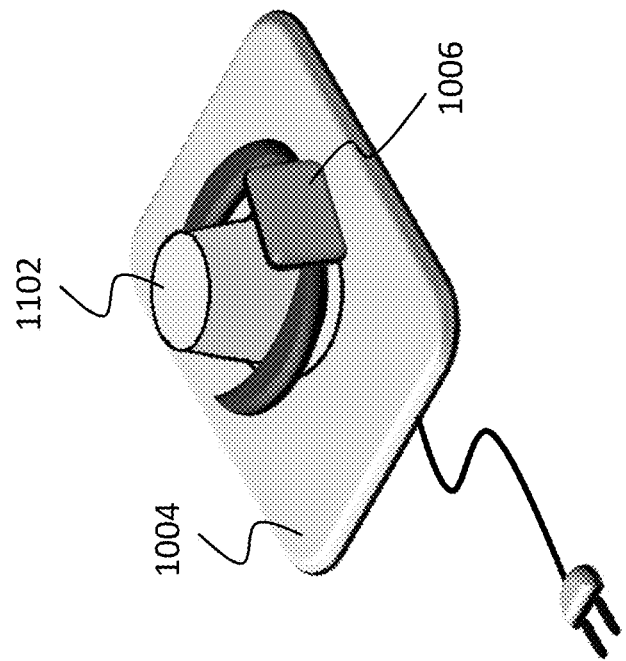
FIGS. 10-11 show exemplary embodiments of a wireless energy transfer system comprising a source, a repeater, and a wearable electronic device.
Figure 10:
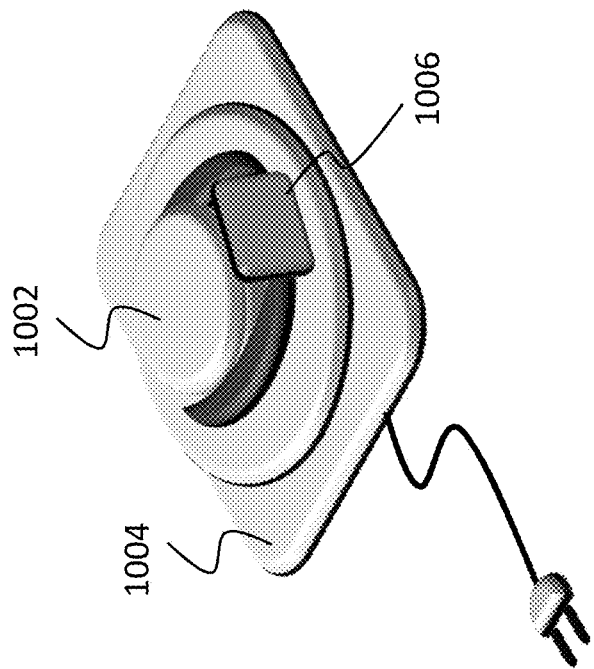

In embodiments, another advantage of a repeater in a wireless energy transfer system may be the portability of the repeater. For example, the repeater may be in a separate housing as shown in FIG. 10 and FIG. 11. This may allow a user to carry or travel with a repeater that can be used with multiple sources to charge a wearable electronic device. In embodiments, a repeater may be compatible with one or more types of sources (such as of different power levels, different standards, and the like).

In exemplary embodiments, a repeater may be passive repeater. In other words, a repeater may comprise one or more inductors and capacitors without driving or control circuitry. In exemplary embodiments, a repeater may be equipped with wireless communication and/or control circuitry. For example, wireless communication such as Bluetooth, WiFi, or radio may be used to communicate with a source. In embodiments, communication may include verifying the power source, establishing a power or communication link with a source, and the like. In embodiments, a repeater may have much of the same communication and control circuitry of a wireless power device so as to "appear" as a compatible device for a wireless power source. This may include having the ability to establish a connection with a wireless power source and presenting an acceptable reflected impedance to a source. In embodiments, an acceptable impedance may be a range of impedance values for which a source can safely and efficiently transfer power. In embodiments, a communication link or channel may need to be established between a source and a repeater to initiate the transfer of wireless power to the wearable electronic device. For discussion and examples on wireless communication in wireless power transfer system, please see at least the following commonly-owned applications: U.S. patent application Ser. No. 13/222,915 published on Mar. 15, 2012 as US 2012/0062345 and entitled "Low resistance electrical conductor," and U.S. patent application Ser. No. 13/283,854 published on Oct. 4, 2012 as US 2012/0248887 and entitled "Multi-Resonator Wireless Energy Transfer for Sensors".

In exemplary embodiments, a wearable device including a device resonator may establish a communication link with the repeater and/or source. In embodiments, the source may vary the magnitude and/or frequency of the magnetic field in response to communication sent by a type of wearable device. In embodiments, a wearable device may be in communication with a repeater to modify a magnetic field generated by the source.

In exemplary embodiments, a repeater may be a tunable repeater. In embodiments, a repeater can have one or more components that may be tunable by power and control circuitry. Components may be inductors and capacitors of an impedance matching network of the repeater. For example, a repeater may have a switchable or tunable capacitor that may be used to tune or detune the repeater. A repeater may be tuned to operate with different sources. A repeater resonator may be tuned depending on the proximity and position of the repeater with respect to the source. In embodiments, a repeater resonator may be detuned to work on or near a source with a high magnetic field strength. For example, a source may be generating a magnetic field with an amplitude that may be too high for the safety of the wearable electronic device and a repeater resonator may be detuned to transfer a safe level of power to the wearable electronic device.

FIGS. 10-11 show exemplary embodiments of wireless power sources and repeaters. Repeaters 1002 and 1102, shown in FIG. 10 and FIG. 11 respectively, are disposed in a housing with the shape of a top-hat and are wirelessly transferring power from a source 1004 to a wearable electronic device 1006. Note that the repeater 1002 may be placed on top of, next to, or near the source 1004. In this embodiment, the source is in the shape of a pad but could take another shape, such as a top-hat.

FIGS. 12A-12B show two views of an exemplary embodiment of a resonator that may be used as a repeater resonator as shown in FIG. 10. FIG. 12A shows a top view of a resonator including a coil 1202 that is constructed using solid wire coupled to one or more capacitors on a circuit board 1204. Solid wire may be solid copper wire, copper-clad aluminum, and the like. FIG. 12B shows a perspective view of the resonator shown in FIG. 12A. In embodiments, the resonator shown in FIGS. 12A-12B may have a quality factor of greater than 100, greater than 200, greater than 300, or more. In embodiments, the resonator includes of a lower portion 1206 of conductive trace that is wound substantially in a first plane and an upper portion 1208 of conductive trace that is wound substantially in a second plane. In embodiments, there may be a non-zero distance between the first and second planes. In embodiments, there may be more than one turn in the upper portion 1208 of conductive trace, and the traces may not lie substantially in the same plane. The conductive traces in the upper portion 1208 may be a continuation of the conductive traces of the lower portion 1206 as shown in FIGS. 12A-12B and may be connected by wire portions 1210 and 1212. Due to the direction of current travelling in the wire, the direction of current in wire portion 1210 opposes the direction current in wire portion 1212. This may cause a reduction in the radial component of the magnetic field near the wire portions 1210, 1212 creating a region of low magnetic coupling (or a null). This effect may be mitigated, modified, or moved in location by creating a larger overlap at 1214. Note that it is also possible to wind the upper conductive traces 1208 so the currents in conductors 1210 and 1212 travel in the same direction.

FIG. 13A shows two views of a repeater resonator to wirelessly transfer power to a wearable device as shown in FIG. 11. In FIG. 11, repeater 1102 transfers wireless power from source 1004 to wearable 1006. The resonator housing 1302 is of a similar shape and size to that of a "K-Cup®" cartridge. A resonator coil is fitted within the housing 1302. In embodiments, the windings of the resonator coil can be positioned along the inner surface of housing 1302. In some embodiments, the windings can make contact with the inner surface of the housing. In exemplary embodiments, the resonator coil has an upper portion 1304 and a lower portion 1306 that occupies a substantially cylindrical volume. The embodiment shown has more turns in the wire of the lower portion 1306 than the turns in the wire of the upper portion 1304, and the housing can taper from the lower portion 1306 to the upper portion 1302. However, in embodiments, there may be more or equal number of turns in the upper portion 1304 as compared to the lower portion 1306. In embodiments, one or more capacitors may be coupled to the resonator coil on a circuit board 1308. FIG. 13B shows a bottom view of the exemplary embodiment of the resonator shown in FIG. 13A. In embodiments, the resonator shown in FIGS. 13A-13B may have a quality factor greater than 100, greater than 200, or more. The number of turns in the upper and lower portions, 1304 and 1306 respectively, can be selected to create the desired magnetic field amplitude in the region between 1304 and 1306 used to charge the wearable device, for a given magnetic field in which the repeater is located.

Figure 14:
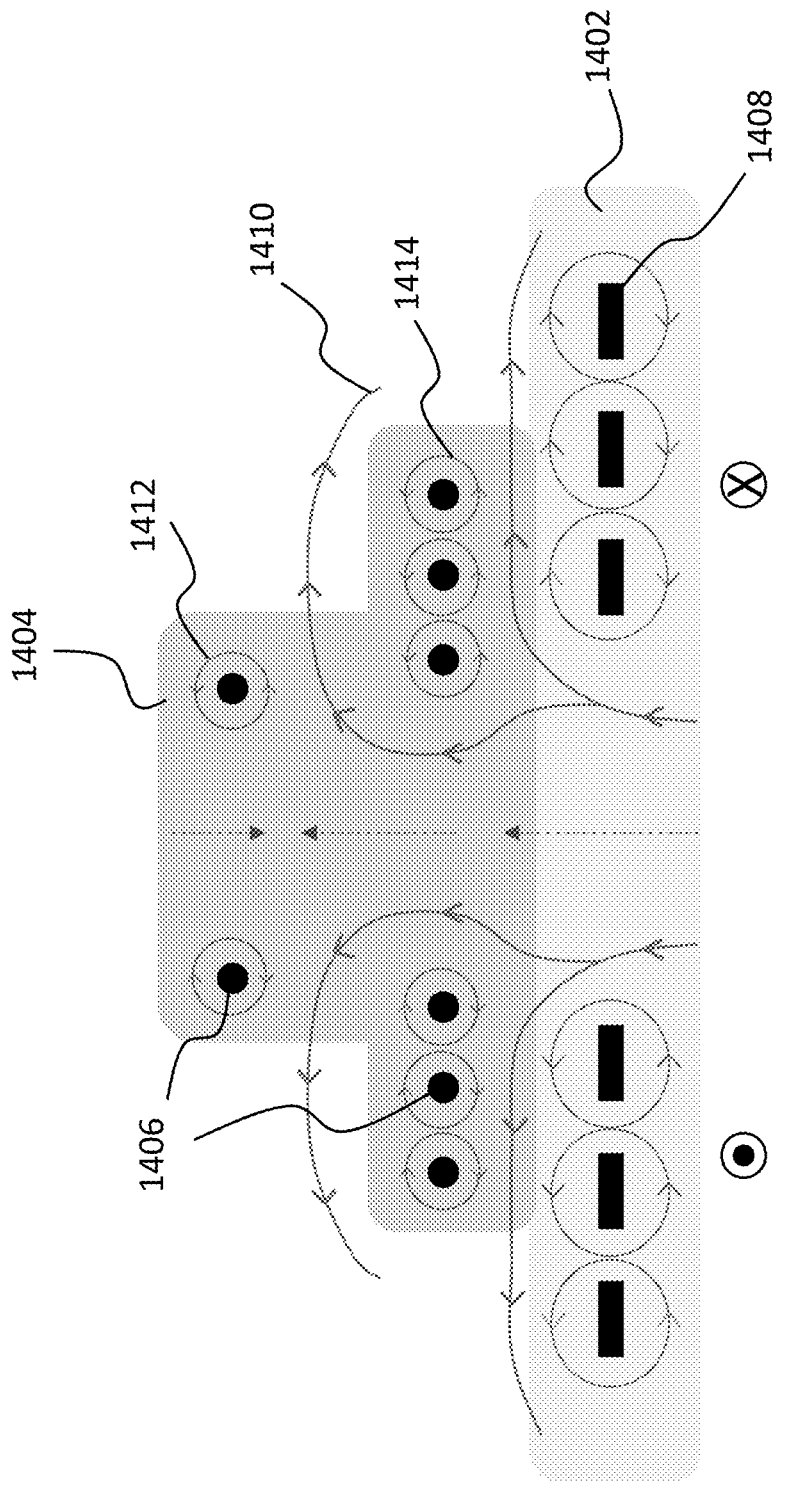
FIGS. 14-15 show cross-sectional views of an exemplary embodiment of a wireless power source and a wireless power repeater.

FIG. 14 shows a cross-sectional diagram of an exemplary embodiment of a wireless power source 1402 and a wireless power repeater 1404. The figure shows a cross-section of the conductors 1406 of a repeater 1404 (such as the one shown in FIGS. 12A-12B) sitting on a source pad 1402 with conductor 1408 wound in a plane (similar to that shown in FIG. 2). The figure shows the magnetic field lines 1410 generated by the source 1402 and the opposing fields 1414 occurring at the conductors 1406 of the repeater. Due to these opposing field lines 1414, the repeater can elevate or funnel the source's magnetic field 1410 as shown. For example, the magnetic field 1410 between the two planes of the repeater resonator coil 1406 is elevated due to the opposing field lines on the bottom plane 1414 and enforcing field lines 1412 on the top plane.

Figure 15:
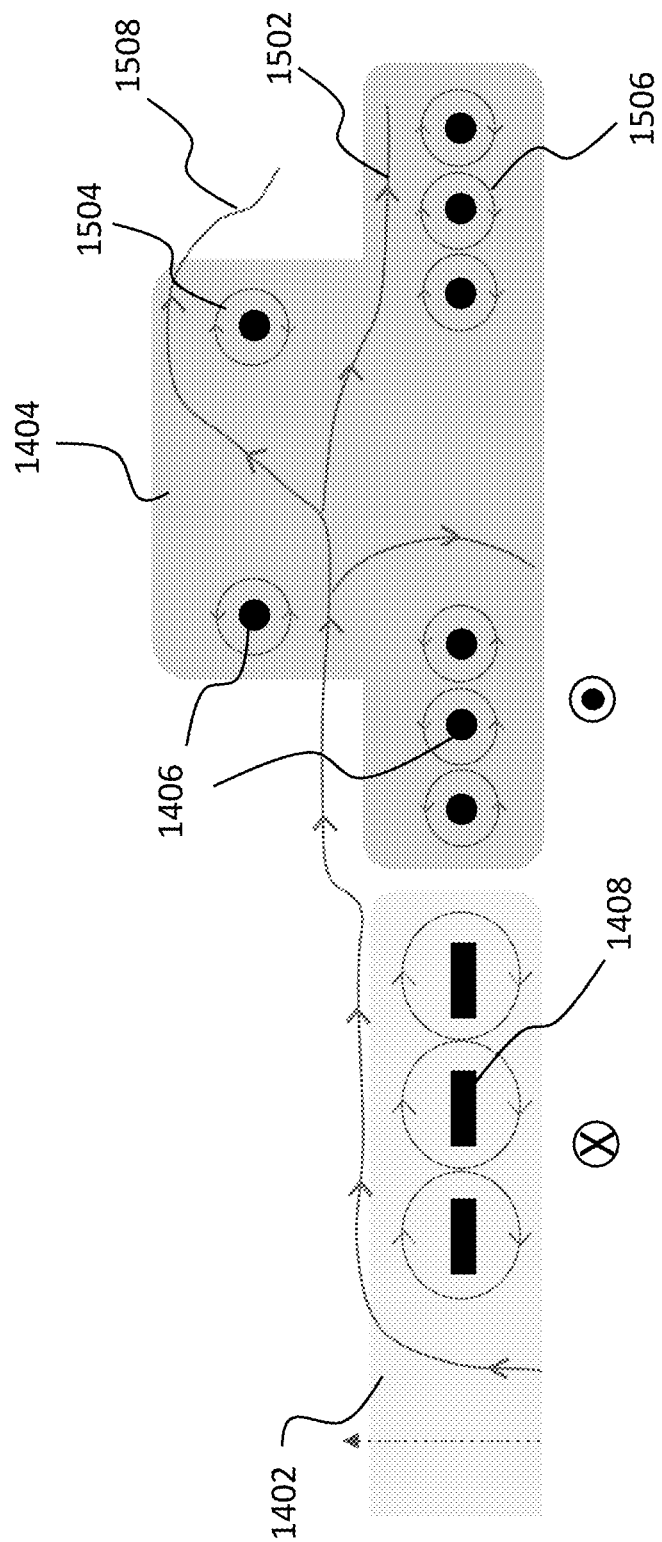

FIG. 15 shows a diagram of an exemplary embodiment of a wireless power source 1402 and wireless power repeater 1404. The figure shows a cross-section of the conductors of a repeater (such as the one shown in FIGS. 12A-12B) positioned beside a source pad 1402 (with a resonator coil similar to that shown in FIG. 2). The figure shows the magnetic field lines 1502 generated by the source 1402 and opposing fields 1504 occurring at the conductors 1408 of the repeater. The opposing field lines 1506 on the top plane of the repeater resonator coil 1406 can oppose magnetic field lines 1502 but can also enforce magnetic field lines 1508. However, the opposing field lines 1506 can enforce magnetic field lines 1502. This can cause the magnetic field lines 1502 to be pushed down toward the conductors of the repeater 1404 that are enforcing (rather than opposing) the magnetic field 1502. In embodiments, a result of magnetic field being shaped as shown may be advantageous for a wearable device that may rest at certain positions on the repeater 1404.

In exemplary embodiments, a resonator used as a repeater resonator as compared to being used as a source resonator may result in different magnetic fields. As discussed above, when a passive resonator, or a resonator that is not being actively driven, is placed on or near a source resonator, opposing currents and/or fields may result. Additionally, a repeater resonator used to transfer power from a source resonator to a device resonator may form different magnetic fields based on its position relative to the source resonator.

Figure 16B:
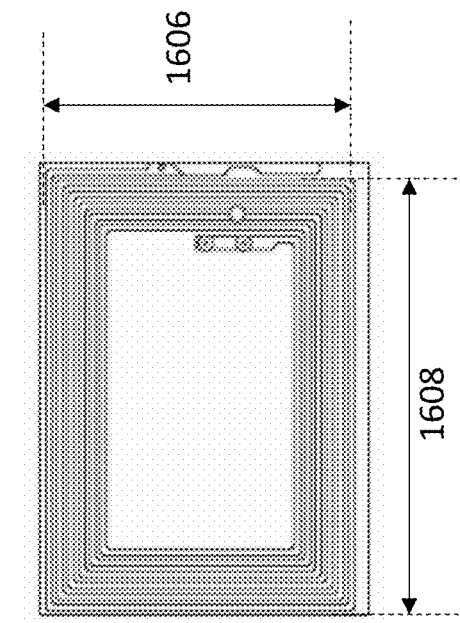
FIGS. 16A-16B show exemplary embodiments of wireless power device resonator coils.
Figure 16A:
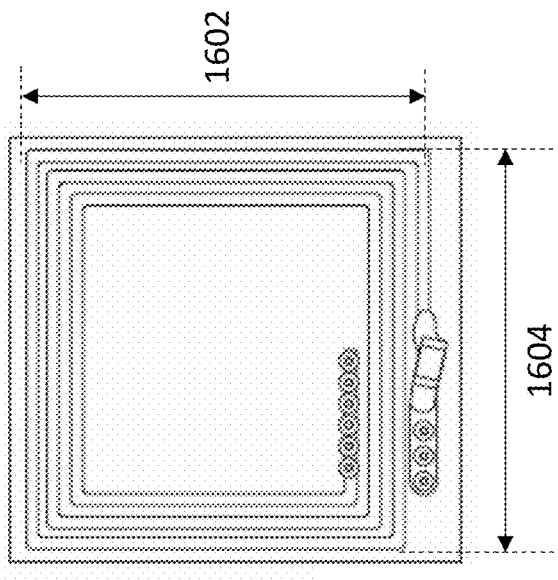

FIGS. 16A-16B show exemplary embodiments of device resonator coils. FIG. 16A shows a device resonator coil that is 28 mm 1602 by 28 mm 1604 with approximately 3 turns or windings. FIG. 16B shows a device resonator coil that is 15 mm 1606 by 20 mm 1608 with approximately 6 turns or windings. In exemplary embodiments, the size of the device resonator coil may be determined by the space or area available on an electronic device. In the case of a wearable device, the area available may be defined by the back of a face, band, or other surface. In embodiments, a source or repeater resonator coil may be designed such that the active area is approximately equal to greater than the largest dimension of a device resonator coil. The active area may be defined by an area or surface of a transmitting resonator that provides power transfer. In embodiments, the active area may be over an area with an acceptable coupling range between the device resonator coil and the source resonator coil. An acceptable coupling range may be coupling k greater than 0.03, greater than 0.05, greater than 0.07, greater than 0.1, or more. In embodiments, the active area of the source resonator coil may be equal or greater than the device resonator coil's outermost conductor loop. In embodiments, the active area of a source resonator coil may be approximately equal to or greater than the average size of device resonator coils that may be used with a particular source resonator coil.

Figure 17A:
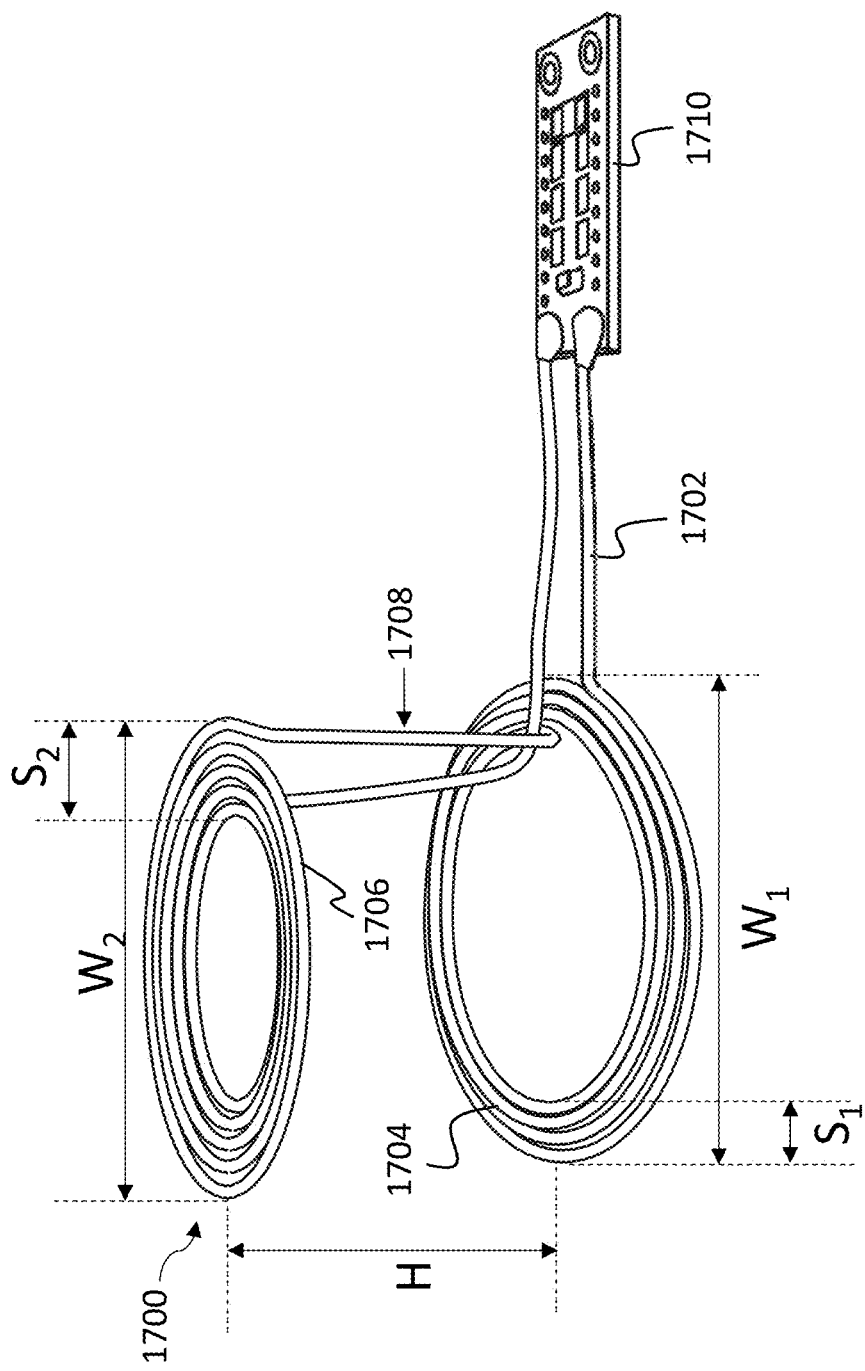
FIGS. 17A-17B show an exemplary embodiment of a resonator for a wireless power source or repeater.
Figure 17B:
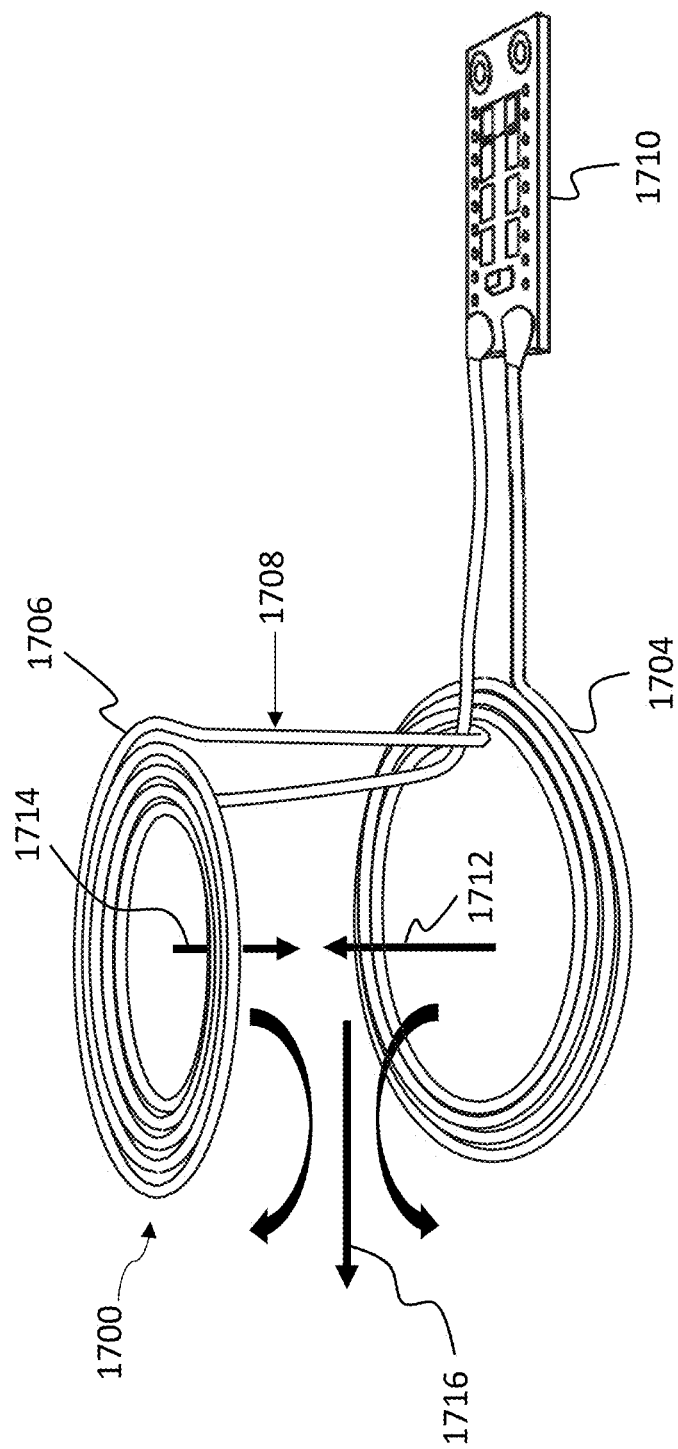

FIGS. 17A-17B show an exemplary embodiment of a resonator that may be used as a source resonator. The resonator 1700 includes a conductor 1702 wound in a first plane 1704 into a first sub-coil and wound in a second plane 1706 to form a second sub-coil, and connected by a bridge 1708. Each sub-coil can define an opening and the sub-coil surface can have a concave profile. In some embodiments, each wound conductor is a concave disk formed from a plurality of turns of the conductor 1702. The resonator 1700 also includes one or more capacitors on a circuit board 1710.

In embodiments, the quality factor of the resonator 1700 may be greater than 50, 75, 100, 200, or more. In embodiments, the inductance of the resonator coil may be approximately equal to or greater than 1 µH. In embodiments, the resonator coil may be made with copper wire, copper-clad aluminum wire, copper-clad steel wire, and the like. The resonator coil shown in FIGS. 17A-17B may be made with 14 gauge copper-clad aluminum and have an inductance of approximately 1.04 µH and a quality factor of approximately 220. The portion of conductor wound in the first plane 1704 has a width $W_1$ of approximately 5 cm and a span $S_1$ of approximately 0.5 cm (including 3 turns of wire). The portion of conductor wound in the second plane 1706 has a width $W_2$ of approximately 4.2 cm and a span $S_2$ of approximately 0.75 cm (including 4 turns of wire). The height H between the conductors wound in each plane is approximately 3.8 cm. In exemplary embodiments, the width $W_1$ and $W_2$ may be a function of the size of the electronic device to be charged. For example, the size of the wristband of a wearable electronic device may determine how large or small $W_1$ and $W_2$ can be.

FIG. 17B shows a representation of the magnetic field of resonator 1700 when driven by a power supply. Due to the windings 1704 and 1706 being spaced apart and facing each other as shown, a radial dipole 1716 is created. This is due to the cancellation of the normal components of dipoles 1712 and 1714. This allows for a more uniform magnetic field outward in the region between the conductors wound in the first plane 1704 and in the second plane 1706.

Figure 18B:
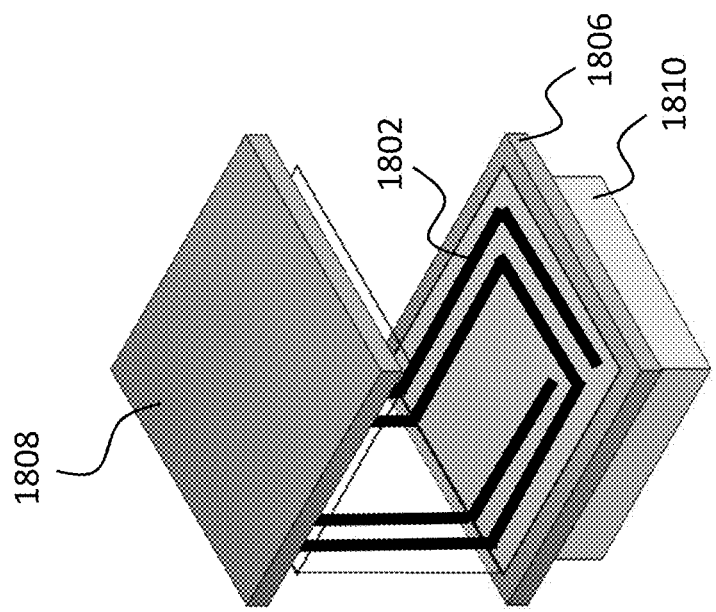
FIGS. 18A-18B show models of exemplary embodiments of a wireless power source.
Figure 18A:
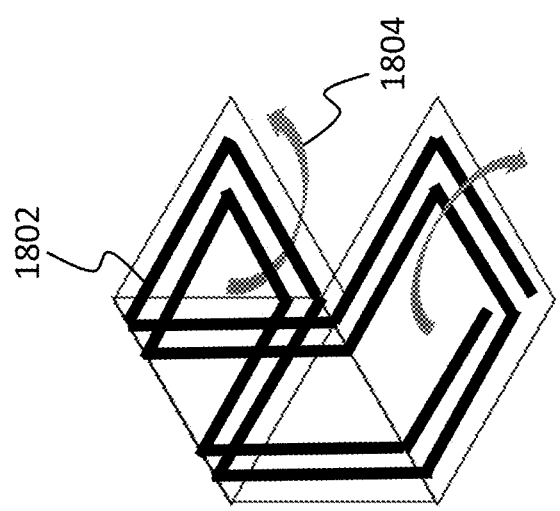

FIG. 18A shows an exemplary embodiment of a resonator coil that may be used in a wireless power transfer source or repeater. In exemplary embodiments, resonator coil 1802 may be helpful to further understand the behavior of the magnetic field for the resonator coil shown in FIGS. 17A-17B. Note that a resonator coil in a 2D plane may be bent to form the resonator 1802 as shown in FIG. 18A. The resulting magnetic field 1804 from driving such a resonator coil as part of a source behaves similarly to the magnetic field shown in FIG. 17B.

In embodiments, shields made of magnetic material or metal material may be used to decrease losses in lossy materials, such as those used in the construction of wearable electronic devices. For example, steel is a particularly lossy metal that is commonly used in the face of a watch. In exemplary embodiments, the device resonator coils shown in FIG. 3A-3C may be shielded with a ferrite with an approximate thickness of 1 mm. The shielding material, ferrite slab or "flexible" ferrite, is positioned between the device resonator and watch face. For examples and discussion on shielding in wireless energy transfer devices, please see at least the commonly-owned U.S. patent application Ser. No. 13/283,854 published on Oct. 4, 2012 as US 2012/0248887 and entitled "Multi-Resonator Wireless Energy Transfer for Sensors".

FIG. 18B shows an exemplary embodiment of a resonator coil 1802 that further includes pieces of magnetic material 1806, 1808. In embodiments, the pieces of magnetic material may be ferrite. The magnetic material 1806 placed below the resonator coil 1802 may prevent losses in any lossy objects 1810 placed under the resonator coil 1802. Lossy objects 1810 may include metallic surfaces and/or the electronics of the source. The source electronics may include those components shown in FIG. 1. The magnetic material 1808 placed above the resonator coil 1802 may prevent an area of too-strong coupling with a device resonator coil. For example, the top region may create an active area that allows a device resonator coil to strongly couple to the source resonator coil. The strength of coupling may cause a failure in the device electronics if the electronics are not designed for the resulting higher voltage. Thus, any device, such as a wearable electronic device placed on that surface will not experience any harm. The result is also that the active area for which power is transferred at an expected coupling will be in the region between the two pieces of magnetic material 1806 and 1808. In embodiments, the expected coupling range may be between 0.05 and 0.1 or greater. In embodiments, another effect of utilizing magnetic material as shown in FIG. 18B may be to increase coupling in the region in between the magnetic material pieces so that the current in the device resonator coil decreases. This may result in lower losses at the device resonator and electronics and therefore, less heating up of the wearable device. In exemplary embodiments, the resonator coil shown in FIGS. 17A-17B may also have pieces of magnetic material on top of the conductor windings 1706 and below the conductor windings 1704. In embodiments, the pieces of magnetic material may be rounded to conform to the rounded shape of the conductor windings of the resonator coil 1700.

Figure 19A:
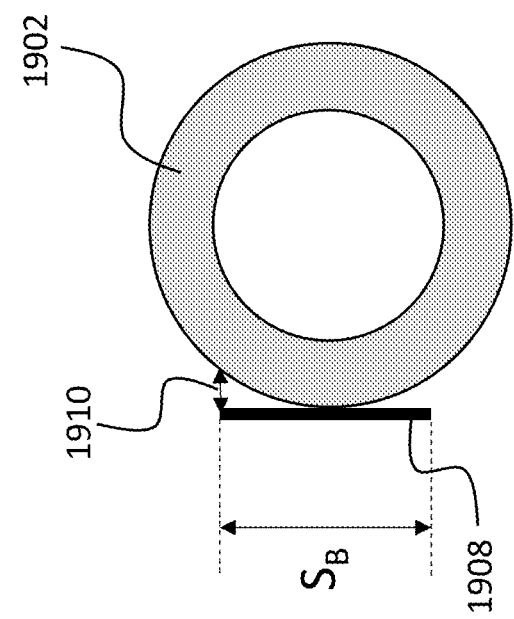
FIGS. 19A-19B show top-view models of exemplary embodiments of a wireless power transfer systems.
Figure 19B:
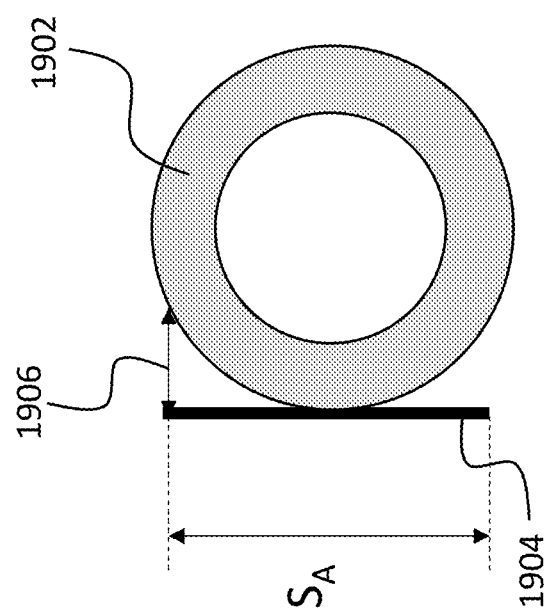

FIGS. 19A-19B show diagrams of a top view of an exemplary source resonator coil 1902 (similar to that shown in FIG. 17A). Also shown is a top view of a device resonator coil 1904 and 1908 positioned tangentially to the source resonator coil 1902. In FIG. 19A, there is a distance 1906 between outer edge of the device resonator coil 1904 of size $S_A$ that is greater than the distance 1910 shown in FIG. 19B for the device resonator coil 1908 of size $S_B$. In exemplary embodiments, it may be beneficial for the device resonator coil to be close as possible to the windings of the source resonator coil to be able to capture greater amount magnetic flux and/or to be better coupled.

Figure 19C:
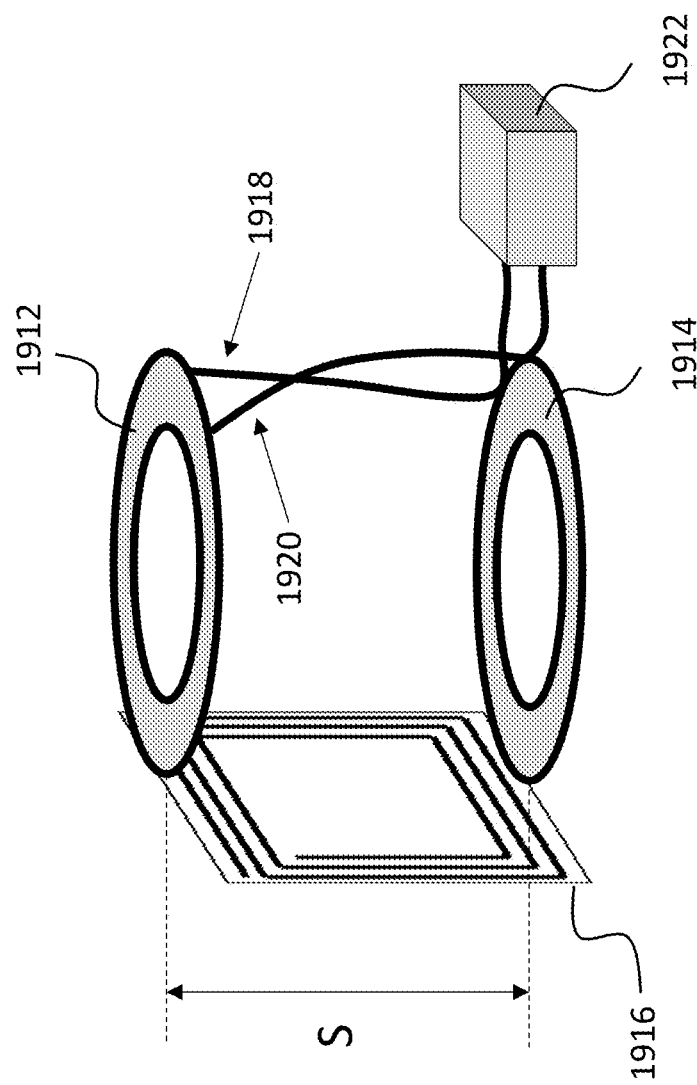
FIG. 19C shows a side-view model of an exemplary embodiment of a wireless power transfer system.

FIG. 19C shows a diagram of an exemplary embodiment of a source resonator coil and a device resonator coil. Source resonator coil includes conductor windings 1912 and 1914. The separation S between the two planes of conductor windings 1912 and 1914 may be approximately equal to or greater than the dimension D of the device resonator coil 1916. For example, the separation S can be about 2 times the dimension D of the device resonator coil 1916. Note that the conductor windings 1912 and 1914 are connected via conductors 1918 and 1920. The conductor leads are coupled to one or more capacitors 1922. The one or more capacitors can be disposed on a printed circuit board. In exemplary embodiments, the conductors 1918 and 1920 can connect conductor windings 1912 and 1914 such that the conductor windings are wound in the same direction or in opposite directions. For example, conductor windings 1912 and 1914 that are wound in the same direction may be part of a repeater resonator. In another example, conductor winding wound in opposite directions may be part of a source resonator.

In exemplary embodiments, the conductor windings 1912 and 1914 may be wound in different shapes such as cylindrical shape, in stacked rings, in flat coil, etc. In embodiments, a resonator coil can have conductor windings with more than one shape, in other words, conductor winding 1912 can be a different shape and size than conductor winding 1914. For example, a resonator coil may have a combination of a cylindrical shape for conductor winding 1912 and a flat coil shape for conductor winding 1914. In embodiments, the conductor windings may be wound such that each turn has a different size. In exemplary embodiments, the device resonator coil can have different shapes, such as circular, elliptical, rectangular, polygonal, etc.

Figure 20:
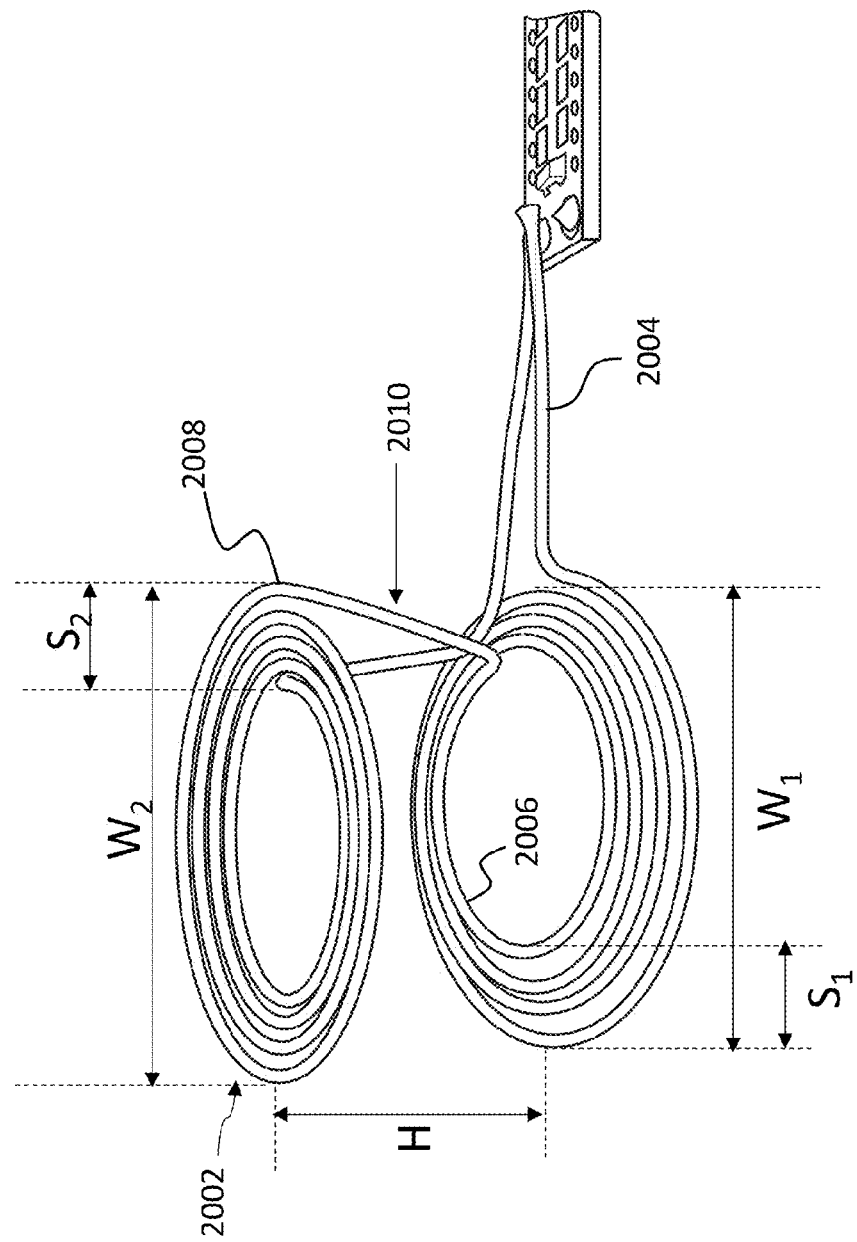
FIG. 20 shows an exemplary embodiments of a resonator for a wireless power source or repeater.

FIG. 20 shows an exemplary embodiment of a resonator that may be used as a source resonator or a repeater resonator. The resonator 2002 includes a continuous conductor 2004 wound in a first plane 2006 to form a first sub-coil and wound in a second plane 2008 to form a second sub-coil, and connected by a bridge 2010. Each sub-coil can define an opening and the sub-coil surface can have a concave profile. In some embodiments, each wound conductor can be a concave disk formed from a plurality of turns of the conductor 2004. In embodiments, each of the sub-coils 2006 and 2008 can be formed on a printed circuit board and then coupled via a connector or wire 2010.

In embodiments, the quality factor of the resonator 2002 may be greater than 50, 75, 100, 150, 200, or more. In embodiments, the inductance of the resonator coil may be approximately equal to or greater than 1 µH. In embodiments, the resonator coil may be made with copper wire, copper-clad aluminum wire, copper-clad steel wire, and the like. The resonator coil may be made with 14 gauge copper-clad aluminum and have an inductance of approximately 1.14 µH and a quality factor of approximately 150. The portion of conductor wound in the first plane 2006 has a width $W_1$ of approximately 4.2 cm and a span $S_1$ of approximately 0.75 cm (including 4 turns of wire). The portion of conductor wound in the second plane 2008 has a width $W_2$ of approximately 3.6 cm and a span $S_2$ of approximately 0.75 cm (including 4 turns of wire). The height H between the conductors in each plane is approximately 2.5 cm.

Figure 21:
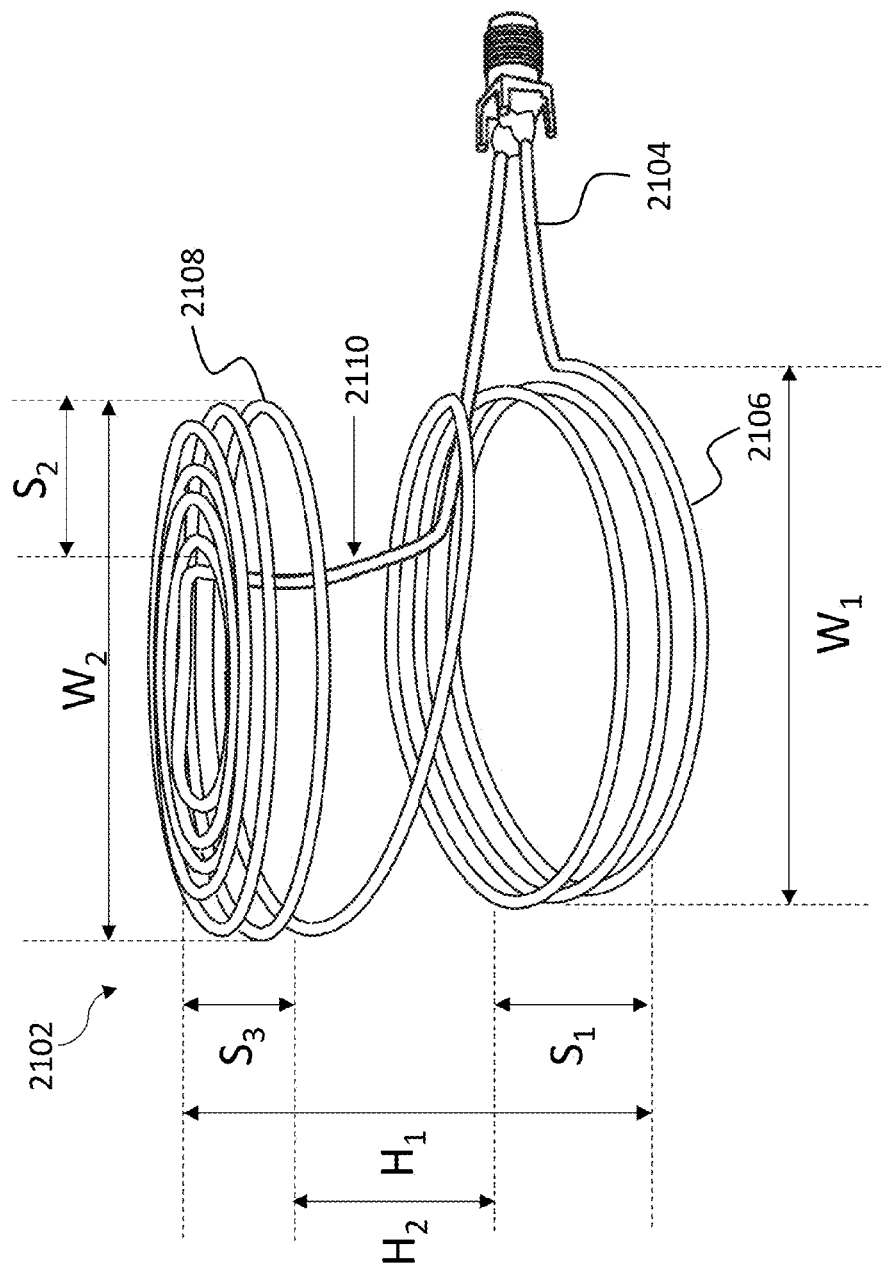
FIG. 21 shows an exemplary embodiments of a resonator coil for a wireless power source or repeater.

FIG. 21 shows an exemplary embodiment of a resonator coil that may be used as a repeater resonator coil. The resonator coil 2102 includes a continuous conductor 2104 wound in a substantially cylindrical shape with a first set of conductor windings at the first end 2106 wound in a horizontal stacked shape and a second set of conductor windings at the second end 2108 wound in the shape of a curved surface, and connected by a bridge 2110. The second set of conductor windings can be formed as an annular ring defining an opening and the ring surface can have a curved profile. The bridge 2108 can include at least one span that winds around the periphery of the substantially cylindrical shape and connects the first and second sets of conductor windings.

In embodiments, the quality factor of the resonator coil 2102 may be greater than 50, 75, 100, 150, 200, or more. In embodiments, the inductance of the resonator coil may be approximately equal to or greater than 2 µH. In embodiments, the resonator coil may be made with copper wire, copper-clad aluminum wire, copper-clad steel wire, and the like. The resonator coil 2102 may be made with 14 gauge copper-clad aluminum and have an inductance of approximately 2.5 µH and a quality factor of approximately 250. The portion of conductor wound at the first end 2106 has a width $W_1$ of approximately 5 cm and a span $S_1$ of approximately 0.9 cm (including 3 turns of wire). The portion of conductor wound at the second end 2110 has a width $W_2$ of approximately 4.5 cm, a span $S_2$ of approximately 1.2 cm (including 5 turns of wire), and a span $S_3$ of approximately 0.5 cm (including 2 turns of wire). The overall height $H_1$ is approximately 3.6 cm. The height $H_2$ between the sets of conductors is approximately 1.8 cm.

The turns of the conductor 2102 are more distributed or spaced apart as compared to the resonator conductor windings shown in FIG. 17A and FIG. 20. The result of distributed conductor windings may be overall lower coupling to the device resonator coil but more uniform coupling as compared to the resonator conductor windings shown in FIG. 17A and FIG. 20. Another result of distributed conductor windings is that it generally results in greater amount of conductor used in the resonator coil which increases the quality factor Q of the resonator.

Figure 22A:
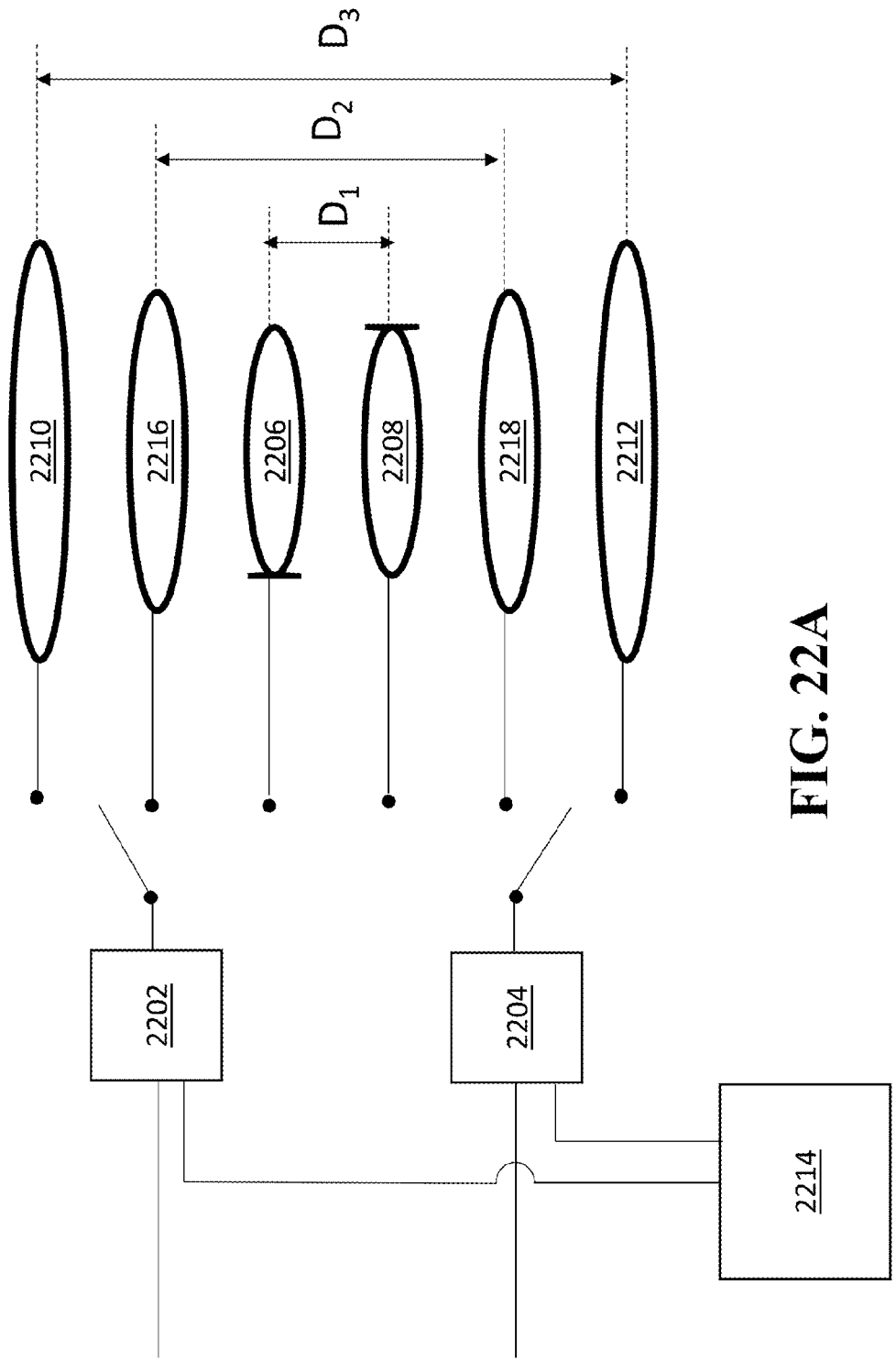
FIGS. 22A-22B show exemplary embodiments of configurations of resonator coils for a wireless power source.

FIG. 22A shows an exemplary embodiment of a wireless power source with adjustable elements. In this embodiment, the source may include several sets of resonator coils that may be switched in and out depending on the size of the device resonator coil of the wearable or electronic device. For example, for a device resonator coil that is of small size, such as approximately equal to or less than $D_1$, the source may have the ability to detect the size of the device resonator coil and change the states of the switches 2202 and 2204 to connect with resonator coils 2206 and 2208. Alternatively, if a source detects a large size device resonator coil, such as one that corresponds to $D_3$, the state of the switches 2202 and 2204 may be changed to connect with 2210 and 2212. In embodiments, a controller 2214 may receive information about the size of the device resonator coil to control the state of switches 2202 and 2204. In embodiments, there may be intermediary cases where resonator coils 2216 and 2218 are switched in. In embodiments, each of the top or bottom set of coils can be formed on a multi-layer printed circuit board. For example, coils 2210, 2216, and 2206 can each occupy a layer of a 3 or more layer board.

Figure 22B:
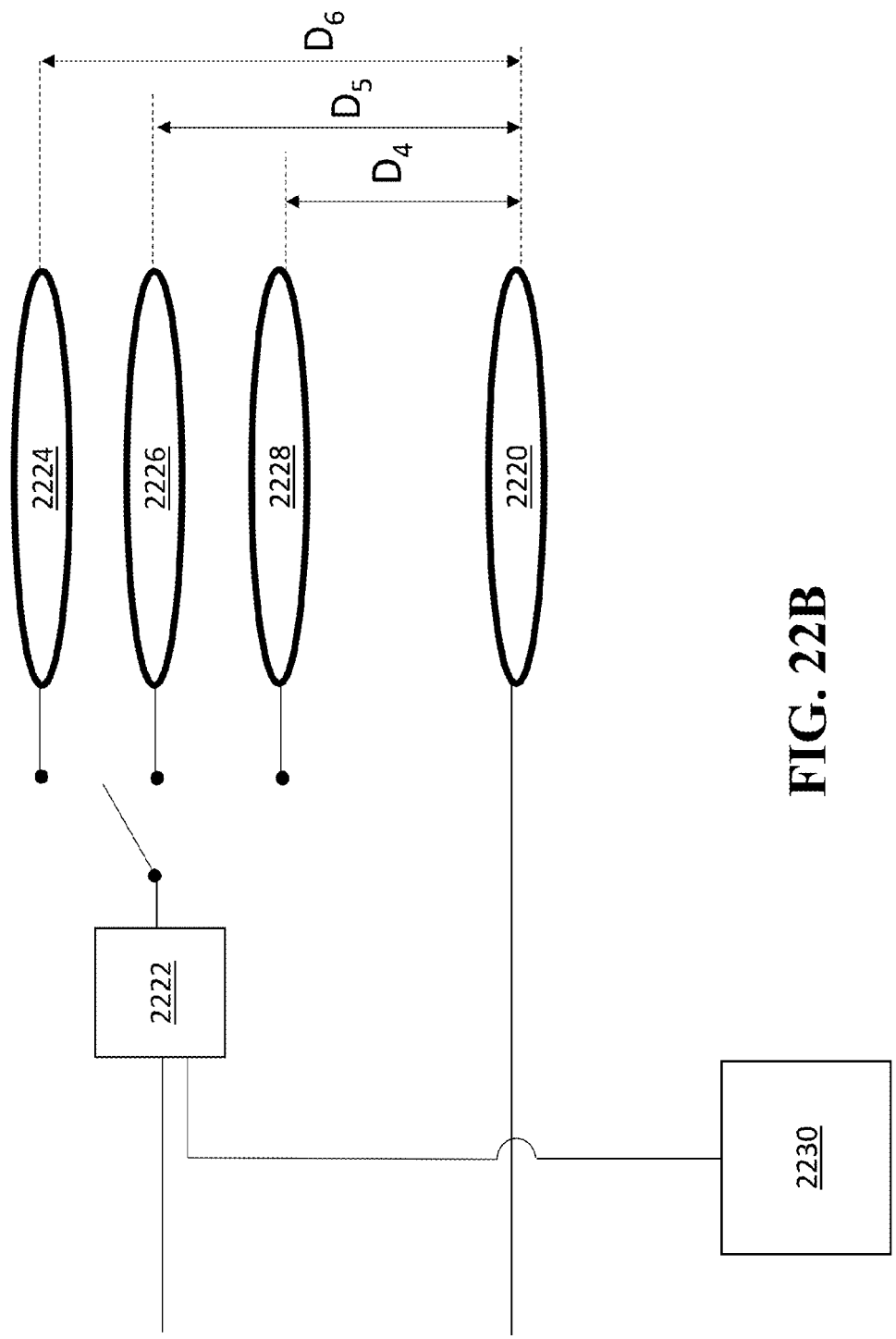

FIG. 22B shows an exemplary embodiment of wireless power source with adjustable elements. In this embodiment, the source may include one or more resonator coils that may be switched in and out depending on the size of the device resonator coil of the wearable or electronic device. In embodiments, a resonator coil 2220 may kept fixed while switch 2222 is utilized to change between resonator coils 2224, 2226, and 2228. Thus, resonator 2224 may be switched in for a large device resonator coil that may have a size that is approximately equal to or less than $D_6$. In embodiments, switch 2222 may be controlled by controller 2230 that may receive information about the size of the device resonator coil. In some cases, the embodiment shown in FIG. 22B may be advantageous over the embodiment shown in FIG. 22A due to less complexity in electronics, such as fewer switches, etc. However, the embodiment shown in FIG. 22A may be more robust and more "customizable" to the size of the device resonator. Another advantage of the embodiment shown in FIG. 22B may be that the mechanical enclosure in which the source resonator coils are housed may itself need to be adjusted. In other words, a mechanical enclosure for the embodiment shown in FIG. 22A may need to be adjusted to properly rest the wearable device closest to the source resonator coils. For the embodiment shown in FIG. 22B, the mechanical enclosure may not need to be adjusted due to a fixed resonator coil 2220 positioned where the bottom of the device resonator coil may rest. In exemplary embodiments, the source resonator coils in either FIG. 22A or FIG. 22B may be coupled in series or parallel. In exemplary embodiments, the source may include a manual switch that a user may toggle. The manual switch may be accessible on the mechanical enclosure of the source and may control which of the source resonator coils are activated. The user may toggle the switch to accommodate for the size of the device resonator coil in or on a wearable electronic device.

Figure 23:
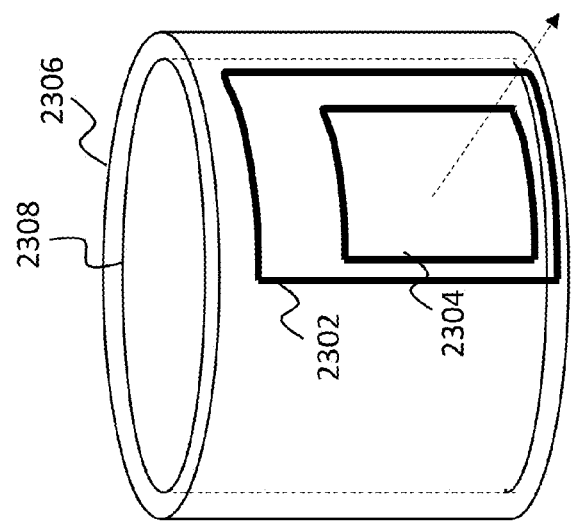
FIG. 23 shows a diagram of an exemplary embodiment of a wireless power source for a wearable.

FIG. 23 shows an embodiment of a two source resonator coils 2302, 2304 each positioned on flexible substrate. This configuration of coils may be positioned into source housings such as those shown in FIGS. 10 and 11. In embodiments, the two source resonator coils can be driven together in or out of phase depending on the strength of field needed to transfer energy to the device. For example, the two coils can be driven approximately 90 degrees out of phase to cancel a portion of the electromagnetic field. In embodiments, one of the source resonator coils can be chosen to transmit power depending on the size of the device resonator coil.

Figure 24A:
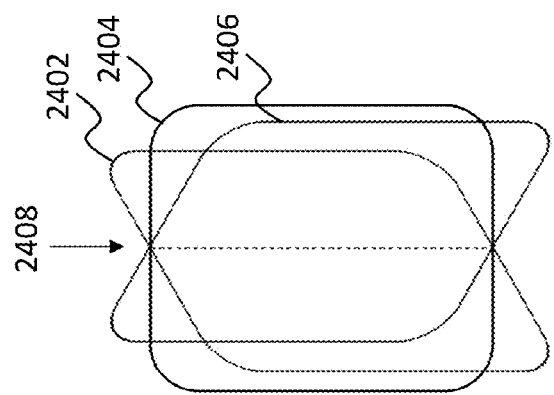
FIGS. 24A-24B show perspective and top views, respectively, of an exemplary embodiment of a wireless power source.
Figure 24B:
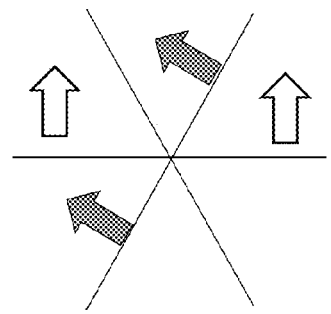

FIG. 24A shows a perspective view of an embodiment of multiple source resonator coils for a wireless power source. The coils 2402, 2404, 2406 ($N_{coils}$=3) share the same center axis 2408. By angling the coils 2402, 2404, 2046 relative to one another about axis 2408, the coils can transmit power in various directions. The coil(s) that are enabled may be determined by the position of the device resonator coil. FIG. 24B shows a top view of the multiple source resonator coil configuration shown in FIG. 24A. In embodiments, there may be two or more source resonator coils sharing the same axis.

FIG. 25A shows a side cross-sectional view of a source for a wearable electronic device. The housing of the source 2502 has a bottom platform on which an inner portion 2504 is raised. The inner portion provides mechanical structure for a wirelessly rechargeable wrist worn electronic device 2506 to sit against or around. Additionally, the inner portion 2504 also houses an inner source resonator coil 2508 and source electronics 2510. The inner source resonator coil 2508 can be similar to those shown in FIG. 8A through FIG. 24. In FIGS. 25A-25B, the portion of the wrist worn electronic device 2506 with a device resonator coil is shown for simplicity. In embodiments, the source 2502 has an outer ring-shaped mechanical portion 2512 on the outer circumference of the source housing. This outer portion 2512 can provide both mechanical support and housing for at least one outer source resonator coil 2514. The outer source resonator coil 2514 can be used to charge electronic device 2506. In yet another embodiment, the outer source resonator coil 2514 can be configured to charge an electronic device 2516 positioned on the outside of the outer mechanical portion 2512. In embodiments, one or both of the source resonator coils 2508 and 2514 can be activated at any given time. In embodiments, the outer source resonator coil may be a repeater and coupled to the inner source resonator coil 2508. FIG. 25B shows a top view of the system shown in FIG. 25A. Arrow 2518 shows direction of charging from inner source resonator coil 2508 to electronic device 2518. In this embodiment, the electronic device has a device resonator coil on the side facing arrow 2518. Arrow 2520 shows direction of charging from outer source resonator coil 2514 to electronic device. In this embodiment, the electronic device has a device resonator coil on the side facing arrow 2520. Arrow 2522 shows direction of charging from outer source resonator coil 2514 to the electronic device 2516 positioned on the outside. In this embodiment, the electronic device 2516 has a device resonator coil on the side facing arrow 2522.

Other Embodiments

In exemplary embodiments, a wireless power source may be disposed on or integrated in places that regularly come into contact with a wearable electronic device. This may include armrests, driving wheels, keyboard, mouse pad, desk, and the like.

In exemplary embodiments, the source and/or repeater may be controlled or programmed to fully charge or "tricklecharge" the battery of a wearable electronic device.

In exemplary embodiments, the resonator coil of the source or repeater may be designed to "focus" the field in one direction. For example, a source resonator coil may be enclosed by a mechanical enclosure that forces the wearable electronic device, such as a smartwatch, to rest in a certain position. The certain position may be that a smartwatch fitted with a device resonator rests facing a particular direction relative to the "window", as shown in FIG. 21C. The source resonator coil may be designed to enforce better coupling in direction of the resting position of the smartwatch.

While the invention has been described in connection with certain preferred embodiments, other embodiments will be understood by one of ordinary skill in the art and are intended to fall within the scope of this disclosure, which is to be interpreted in the broadest sense allowable by law. For example, designs, methods, configurations of components, etc. related to transmitting wireless power have been described above along with various specific applications and examples thereof. Those skilled in the art will appreciate where the designs, components, configurations or components described herein can be used in combination, or interchangeably, and that the above description does not limit such interchangeability or combination of components to only that which is described herein.

All documents referenced herein are hereby incorporated by reference.

What is claimed is:

1. A resonator to wirelessly transfer energy to a wireless power device comprising a device resonator coil having a dimension D, the resonator comprising:
   a first plurality of conductor windings wound approximately in a first plane and having first and second conductor leads; and
   a second plurality of conductor windings wound in a second plane and having third and fourth conductor leads;
   wherein the first and third conductor leads are coupled to each other and the second and the fourth conductor leads are coupled to at least one capacitor;
   wherein the first plane and second plane are spaced apart by separation S and substantially parallel; and
   wherein the separation S between the first plane and second plane is approximately equal to or greater than the dimension D of the device resonator coil.

2. The resonator of claim 1 wherein, when driven with an oscillating current, the resonator generates an oscillating electromagnetic field.

3. The resonator of claim 2 wherein the first plurality of conductor windings has a first dipole and the second plurality of conductor windings has a second dipole and wherein normal components of the first and second dipole moments cancel each other.

4. The resonator of claim 3 wherein the electromagnetic field has a radial dipole through the separation S.

5. The resonator of claim 1 wherein the first and second plurality of conductor windings comprises copper, copper-clad aluminum, or Litz wire.

6. The resonator of claim 1 wherein the first and second plurality of conductor windings each comprises at least three turns.

7. The resonator of claim 1 wherein a length of an outermost winding of a third plurality of windings of the device resonator coil defines the dimension D.

8. The resonator of claim 1 wherein a first piece of magnetic material is disposed on a bottom surface of the first conductor wound in the first plane.

9. The resonator of claim 1 wherein a second piece of magnetic material is disposed on a top surface of the second conductor wound in the second plane.

10. The resonator of claim 1 wherein the resonator is a repeater resonator and wherein the first and second plurality of conductor windings are wound in a same direction.

11. The resonator of claim 1 wherein the resonator is a source resonator and wherein the first and second plurality of conductor windings are wound in different directions.

12. The resonator of claim 1 wherein a first portion of the first plurality of conductor windings is positioned above the first plane.

13. The resonator of claim 1 wherein a second portion of the first plurality of conductor windings is positioned below the first plane.

14. The resonator of claim 1 wherein a third portion of the first plurality of conductor windings is positioned in the first plane.

15. The resonator of claim 1 wherein a first portion of the second plurality of conductor windings is positioned above the second plane.

16. The resonator of claim 1 wherein a second portion of the second plurality of conductor windings is positioned below the second plane.

17. The resonator of claim 1 wherein a third portion of the second plurality of conductor windings is positioned in the second plane.

18. The resonator of claim 1 wherein at least one of the first or second plurality of conductor windings forms a stacked ring.

19. The resonator of claim 1 wherein at least one of the first or second plurality of conductor windings forms a cylindrical shape.

20. A wireless power transfer system comprising:
a source resonator comprising:
a first plurality of conductor windings wound in a first plane and having first and second conductor leads;
a second plurality of conductor windings wound in a second plane and having third and fourth conductor leads; and
a device resonator comprising a third plurality of conductor windings wound in a third plane having a dimension D;
wherein the first and third conductor leads are coupled to each other and the second and the fourth conductor leads are coupled to at least one capacitor;
wherein the first plane and second plane are spaced apart by separation S and substantially parallel; and
wherein separation S between the first plane and second plane is approximately equal to or greater than the dimension D of the device resonator coil.

21. The system of claim 20 wherein the first and second plurality of conductor windings disposed along an inner surface of a housing, the housing comprising non-conductive material.

22. The system of claim 21 wherein the first and second plurality of conductor windings contact the inner surface of the housing.

* * * * *